(12) United States Patent
Slevinsky

(10) Patent No.: US 11,032,382 B2
(45) Date of Patent: Jun. 8, 2021

(54) DATA LOGGING FROM A WEARABLE COMPUTING DEVICE

(71) Applicant: GOOGLE LLC, Mountain View, CA (US)

(72) Inventor: Mark Oliver Slevinsky, Waterloo (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/590,940

(22) Filed: Oct. 2, 2019

(65) Prior Publication Data
US 2020/0106846 A1    Apr. 2, 2020

Related U.S. Application Data

(60) Provisional application No. 62/740,188, filed on Oct. 2, 2018.

(51) Int. Cl.
| | | |
|---|---|---|
| *H04L 29/08* | (2006.01) | |
| *G06F 1/16* | (2006.01) | |
| *H04B 1/3827* | (2015.01) | |

(52) U.S. Cl.
CPC .............. *H04L 67/24* (2013.01); *G06F 1/163* (2013.01); *H04B 1/385* (2013.01); *H04L 67/32* (2013.01)

(58) Field of Classification Search
None
See application file for complete search history.

(56) References Cited

U.S. PATENT DOCUMENTS

| | | | | |
|---|---|---|---|---|
| 2005/0251579 | A1* | 11/2005 | Ngo | G07C 5/085 709/234 |
| 2011/0246428 | A1* | 10/2011 | Alfano | H04L 41/0213 707/661 |
| 2019/0028375 | A1* | 1/2019 | Kandula | G06F 11/3006 |

* cited by examiner

*Primary Examiner* — Chris Parry
*Assistant Examiner* — Chouat Abderrahmen

(57) ABSTRACT

Systems, devices, and methods of gathering logging data from a wearable computing device. A processor of the wearable computing device generates one or more log messages. The one or more log messages are stored by the processor. When the processor determines that a consolidated log of the one or more messages is to be generated, the processor generates the consolidated log and transmits the consolidated log to a storage device.

14 Claims, 23 Drawing Sheets

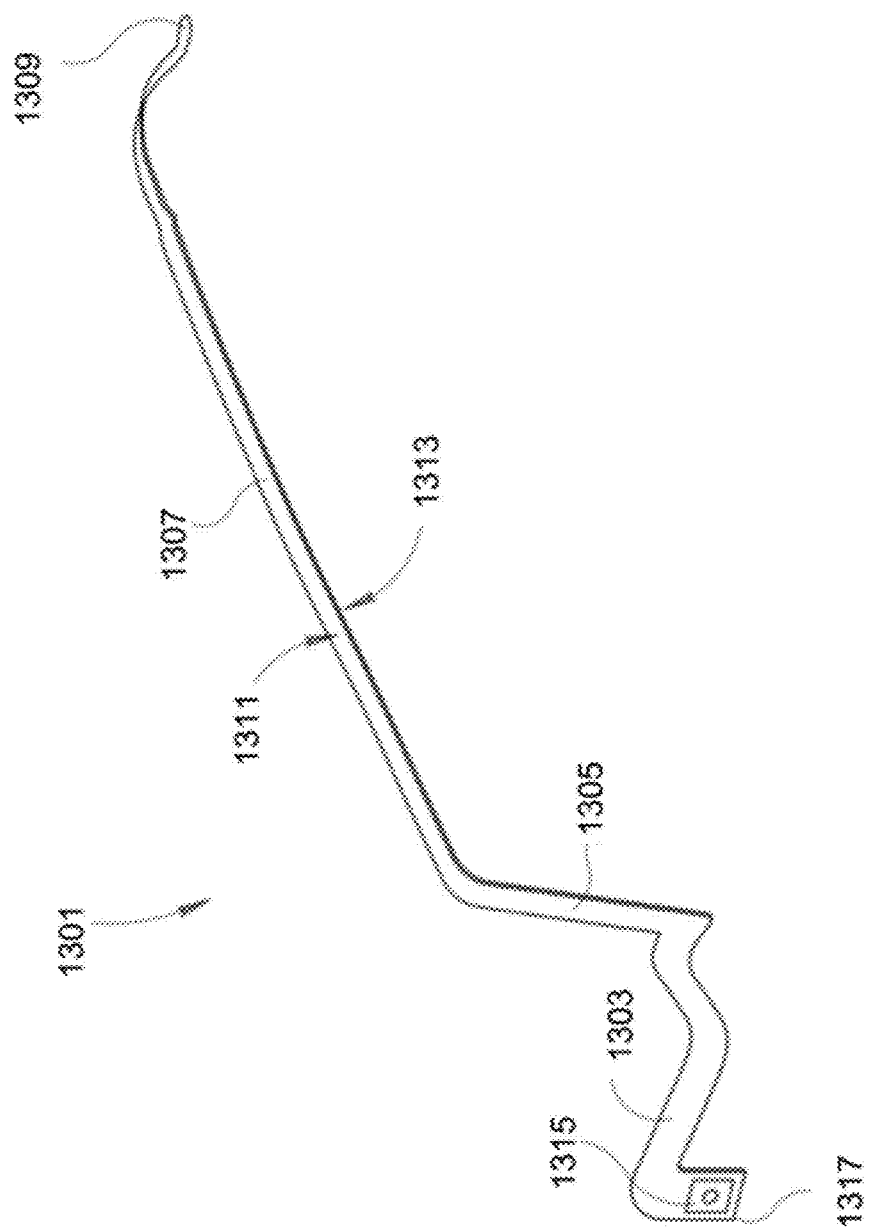

DATA LOGGING FROM A WEARABLE COMPUTING DEVICE

CROSS-REFERENCE TO RELATED APPLICATIONS

This application claims the benefit of U.S. Provisional Application No. 62/740,188, filed 2 Oct. 2018, the content of which is incorporated herein by reference.

TECHNICAL FIELD

The present systems, devices, and methods generally relate to wearable computing devices capable of network communications.

BACKGROUND

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be "wireless" (i.e., designed to operate without any wire-connections to other, non-portable electronic systems); however, a small and lightweight electronic device may still be considered portable even if it includes a wire-connection to a non-portable electronic system. For example, a microphone may be considered a portable electronic device whether it is operated wirelessly or through a wire-connection.

The convenience afforded by the portability of electronic devices has fostered a huge industry. Smartphones, audio players, laptop computers, tablet computers, and e-book readers are all examples of portable electronic devices. However, the convenience of being able to carry a portable electronic device has also introduced the inconvenience of encumbering the user's hands with the device itself. This problem is addressed by making an electronic device not only portable, but wearable.

A wearable electronic device is any portable electronic device that a user can carry without physically grasping, clutching, or otherwise holding onto the device with their hands. For example, a wearable electronic device may be attached or coupled to the user by a strap or straps, a band or bands, a clip or clips, an adhesive, a pin and clasp, an article of clothing, tension or elastic support, an interference fit, an ergonomic form, etc. Examples of wearable electronic devices include digital wristwatches, electronic armbands, electronic rings, electronic ankle-bracelets or "anklets," head-mounted electronic display units, hearing aids, and so on.

Because they are worn on the body of the user, visible to others, and generally present for long periods of time, form factor (i.e., size, geometry, and appearance) is a major design consideration in wearable electronic devices.

BRIEF SUMMARY

A method of gathering logging data from a wearable computing device may be summarized as including: a processor of the wearable computing device generating one or more log messages; the processor of the wearable computing device storing the one or more log messages; the processor of the wearable computing device determining that a consolidated log is to be generated, the consolidated log comprising the one or more log messages; and the processor of the wearable computing device generating the consolidated log and transmitting the consolidated log to a storage device.

The method may further include the processor of the wearable computing device transmitting the consolidated log to a host computing device as the storage device.

The method may further include the processor of the wearable computing device transmitting the consolidated log to a remote computing device as the storage device.

The method may further include the processor receiving a request from a remote computing device, and determining, based on the request, that the consolidated log is to be generated.

The method may further include the processor receiving the request from the remote computing device via the host computing device.

The method may further include the processor determining, based on a preset time interval, that the consolidated log is to be generated.

The method may further include the processor determining, based on a predefined time, that the consolidated log is to be generated.

The method may further include the processor determining, based on a size threshold of the one or more log messages, that the consolidated log is to be generated.

The method may further include the processor determining, based on a power status of the wearable computing device, that the consolidated log is to be generated.

The method may further include the processor determining, based on a connectivity status of the wearable computing device, that the consolidated log is to be generated.

The method may further include the processor deferring the generating of the consolidated log based on the power status of the wearable computing device.

The method may further include the processor deferring the generating of the consolidated log based on the connectivity status of the wearable computing device.

A non-transitory computer-readable medium storing computer-executable instructions for gathering logging data from a wearable computing device may be summarized as including, the instructions when executed by a computer processor of the wearable computing device for causing the computer processor to: generate one or more log messages; store the one or more log messages; determine that a consolidated log is to be generated, the consolidated log comprising the one or more log messages; and generate the consolidated log and transmit the consolidated log to a storage device.

The instructions may further cause the computer processor to transmit the consolidated log to a host computing device as the storage device.

The instructions may further cause the computer processor to transmit the consolidated log to a remote computing device as the storage device.

The instructions may further cause the computer processor to receive a request from a remote computing device, and determine, based on the request, that the consolidated log is to be generated.

The instructions may further cause the computer processor to receive the request from the remote computing device via the host computing device.

The instructions may further cause the computer processor to determine, based on a preset time interval, that the consolidated log is to be generated.

The instructions may further cause the computer processor to determine, based on a predefined time, that the consolidated log is to be generated.

The instructions may further cause the computer processor to determine, based on a size threshold of the one or more log messages, that the consolidated log is to be generated.

The instructions may further cause the computer processor to determine, based on a power status of the wearable computing device, that the consolidated log is to be generated.

The instructions may further cause the computer processor to determine, based on a connectivity status of the wearable computing device, that the consolidated log is to be generated.

The instructions may further cause the computer processor to defer the generating of the consolidated log based on the power status of the wearable computing device.

The instructions may further cause the computer processor to defer the generating of the consolidated log based on the connectivity status of the wearable computing device.

A method of gathering logging data from a wearable computing device may be summarized as including: the processor of a remote computing device determining that a consolidated log is to be requested, the consolidated log comprising one or more log messages; the processor of the remote computing device requesting the consolidated log from the wearable computing device; the processor of the remote computing device receiving the consolidated log from the wearable computing device; and the processor of the remote computing device storing the consolidated log.

The method may further include the processor requesting and receiving the consolidated log from the wearable computing device via a host computing device.

The method may further include the processor determining, based on a preset time interval, that the consolidated log is to be requested.

The method may further include the processor determining, based on a predefined time, that the consolidated log is to be requested.

The method may further include the processor determining, based on a power status of the wearable computing device, that the consolidated log is to be requested.

The method may further include the processor determining, based on a connectivity status of the wearable computing device, that the consolidated log is to be requested.

The method may further include the processor deferring the requesting of the consolidated log based on the power status of the wearable computing device.

The method may further include the processor deferring the requesting of the consolidated log based on the connectivity status of the wearable computing device.

BRIEF DESCRIPTION OF THE DRAWINGS

In the drawings, identical reference numbers identify similar elements or acts. The sizes and relative positions of elements of the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 13B is a perspective view of the antenna of FIG. 13A.

DETAILED DESCRIPTION

Figure 1:
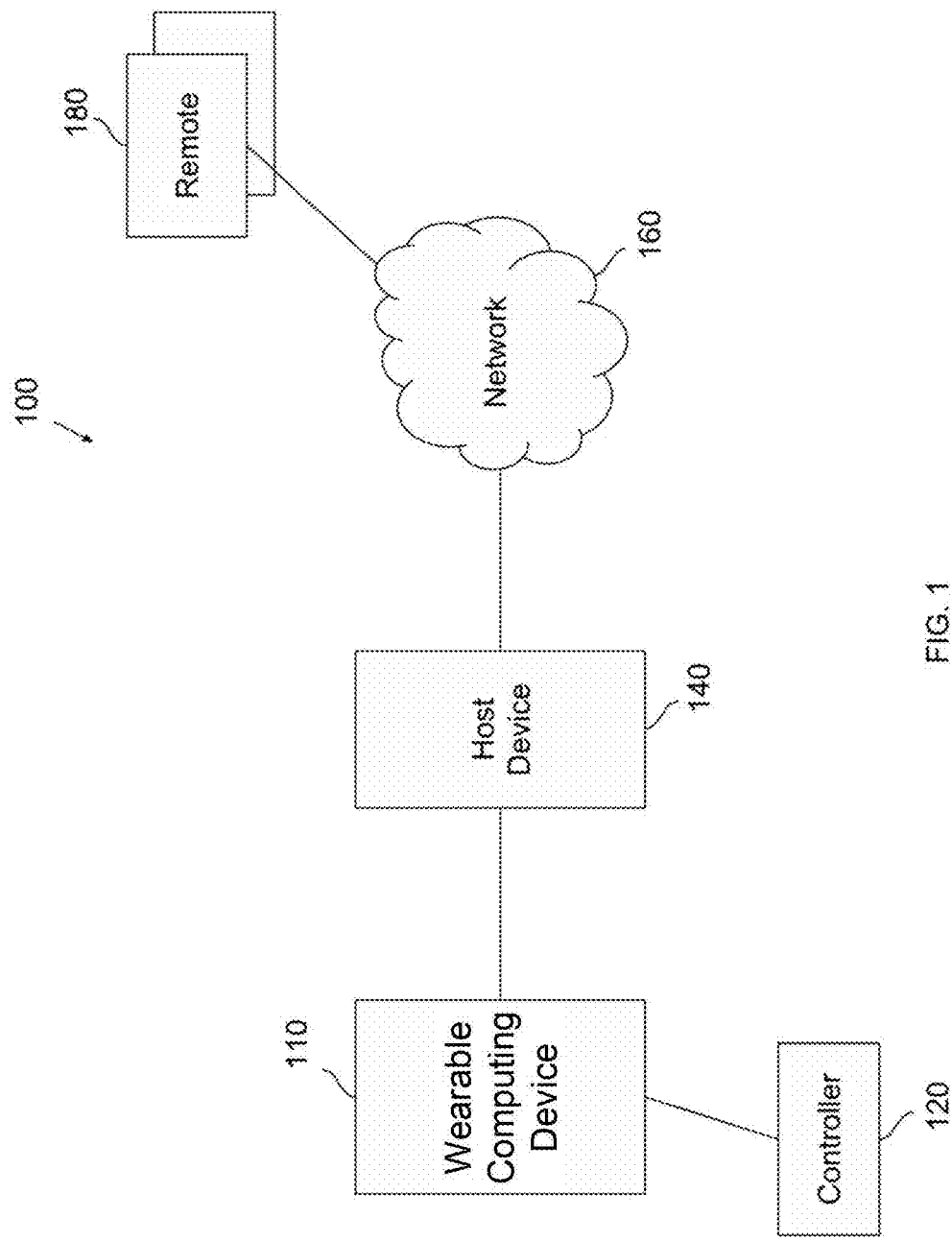
FIG. 1 is a schematic block diagram of a delegated network access system for a wearable computing device in accordance with at least some embodiments.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details, or with other methods, components, materials, etc. In other instances, well-known methods, procedures and components have not been described in detail have not been shown or described in detail to avoid unnecessarily obscuring descriptions of the embodiments, and since these are known to those skilled in the art. Furthermore, it should be noted that this description is not intended to limit the scope of the embodiments described herein, but rather as merely describing one or more exemplary implementations.

Unless the context requires otherwise, throughout the specification and claims which follow, the word "comprise" and variations thereof, such as, "comprises" and "comprising" are to be construed in an open, inclusive sense, that is as "including, but not limited to."

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

Reference throughout this specification to "one implementation" or "an implementation" or "one embodiment" or "an embodiment" means that a particular feature, structures, or characteristics may be combined in any suitable manner in one or more implementations or one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations or embodiments.

The terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device.

Similarly, throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), optical pathways (e.g., optical fiber), electromagnetically radiative pathways (e.g., radio waves), or any combination thereof. Exemplary communicative couplings include, but are not limited to, electrical couplings, magnetic couplings, optical couplings, radio couplings, or any combination thereof.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The example implementations or embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g., a keyboard, mouse, touchscreen, or the like), and at least one output device (e.g., a display screen, a printer, a wireless radio, or the like) depending on the nature of the device.

It should also be noted that there may be some elements that are used to implement at least part of one of the implementations or embodiments described herein that may be implemented via software that is written in a high-level computer programming language such as one that employs an object-oriented paradigm. Accordingly, the program code may be written in Java, C++ or any other suitable programming language and may comprise modules or classes, as is known to those skilled in object-oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, read-only memory (ROM), electrically erasable programmable read-only memory (EEPROM), magnetic disk, optical disc) or a device that is readable by a general or special purpose programmable device. The software program code, when read by the programmable device, configures the programmable device to operate in a new, specific and predefined manner in order to perform at least one of the methods described herein.

The description sets forth various embodiments of the systems, devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory computer-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM), EEPROM, flash memory, a portable compact disc read-only memory (CDROM), digital tape, and other non-transitory media.

Referring now to FIG. 1, there is illustrated a schematic block diagram of a delegated network access system for a wearable computing device in accordance with at least some embodiments.

In the example of FIG. 1, delegated network access system 100 has a wearable computing device 110, a controller device 120, a host device 140, and one or more remote computing devices 180, connected to the host device 140 via a network 160.

Host device 140 and remote computing devices 180 are each computing devices generally equipped for data communication via network 160. Network 160 may be a public network, such as the Internet, a private network, or some combination thereof. In some cases, network 160 may be a direct communications link. The data communication network can be constructed using various networking technologies and topologies. For example, portions of the network may be mobile data networks. Although not explicitly described in each case, communications between the various elements of system 100 generally involve session-level security, such as Transport Layer Security (TLS).

Wearable computing device 110 may be a computing device as described further herein and, in particular, wearable computing device 110 may be equipped with a wireless personal area network (PAN) interface. Examples of a wireless PAN may include, but are not limited to, interfaces that implement the Bluetooth™ standard (e.g., Bluetooth™ 4.2, or earlier, or more recent versions to the extent that such versions are functionally consistent with existing versions) or Bluetooth™ Low Energy (BLE) standard.

Wearable computing device 110 communicates with host device 140 and controller device 120 via one or more wireless PAN. Generally, wearable computing device 110 may use Bluetooth™ for communication with host device 140 and BLE for communication with controller device 120, given the latter's lower energy and data usage.

Controller device 120 is another computing device that may be used as an input device for wearable computing device 110, as described further herein.

In at least some embodiments, wearable computing device 110 may communicate with remote computing devices 180 via host device 140 and network 160. Generally, host device 140 may act as a communication gateway to network 160 and remote computing devices 180 on behalf of wearable computing device 110. That is, host device 140 may receive data from wearable computing device 110 over a wireless PAN and forward the received data to remote computing devices 180 over an Internet-connected interface, and vice versa. In some other embodiments, where wearable computing device 110 is equipped with appropriate data communications interfaces, wearable computing device 110 may communicate directly with remote computing devices 180 via network 160.

Host device 140 is a computing device, such as a mobile phone, smartphone or tablet. In at least some embodiments, host device 140 is a wireless mobile device. In addition to a wireless PAN interface such as Bluetooth™ or BLE, or both, host device 140 is generally equipped with a mobile wireless data communications interface, such as Global System for Mobile Communications (GSM), Enhanced Data Rates for GSM Evolution (EDGE), Universal Mobile Telecommunications System (UMTS), Long Term evolution (LTE), 5G systems and the like. In some embodiments, host device 140 may be equipped with a wireless data communications interface capable of communication in one or more of the IEEE 802.11 family of protocols (e.g., "Wi-Fi"). In still other embodiments, host device 140 may be equipped with a fixed data communications interface capable of communication in, e.g., the IEEE 802.3 family of protocols (e.g., "Ethernet").

Each of remote computing devices 180 is a computer, such as a computer server. Remote computing devices 180 may provide, for example, a network-based service. For example, one or more remote computing devices 180 may provide communication services such as e-mail, instant messaging or voice or video telephony, a navigation service, a data storage service, an authentication service, a weather service, a calendar service, a software update service, a search service, and so on.

Although illustrated as a single group of devices, each remote computing device 180 may be constructed from multiple devices, as in a server farm, which may be in geographically diverse locations, and accessed via a load balancer. Such arrangements are sometimes referred to as a "cloud" service. For example, network remote computing device 180 may be constructed of multiple edge node servers, which replicate and serve data in geographically diverse locations. The functionality described herein as provided by a particular server (e.g., remote computing device 180) may be divided among multiple physical devices, which are then logically linked or merged from the third-party perspective. In some cases, one or more server may be a virtual machine, which operates in a host environment using virtualized hardware.

Figure 2:
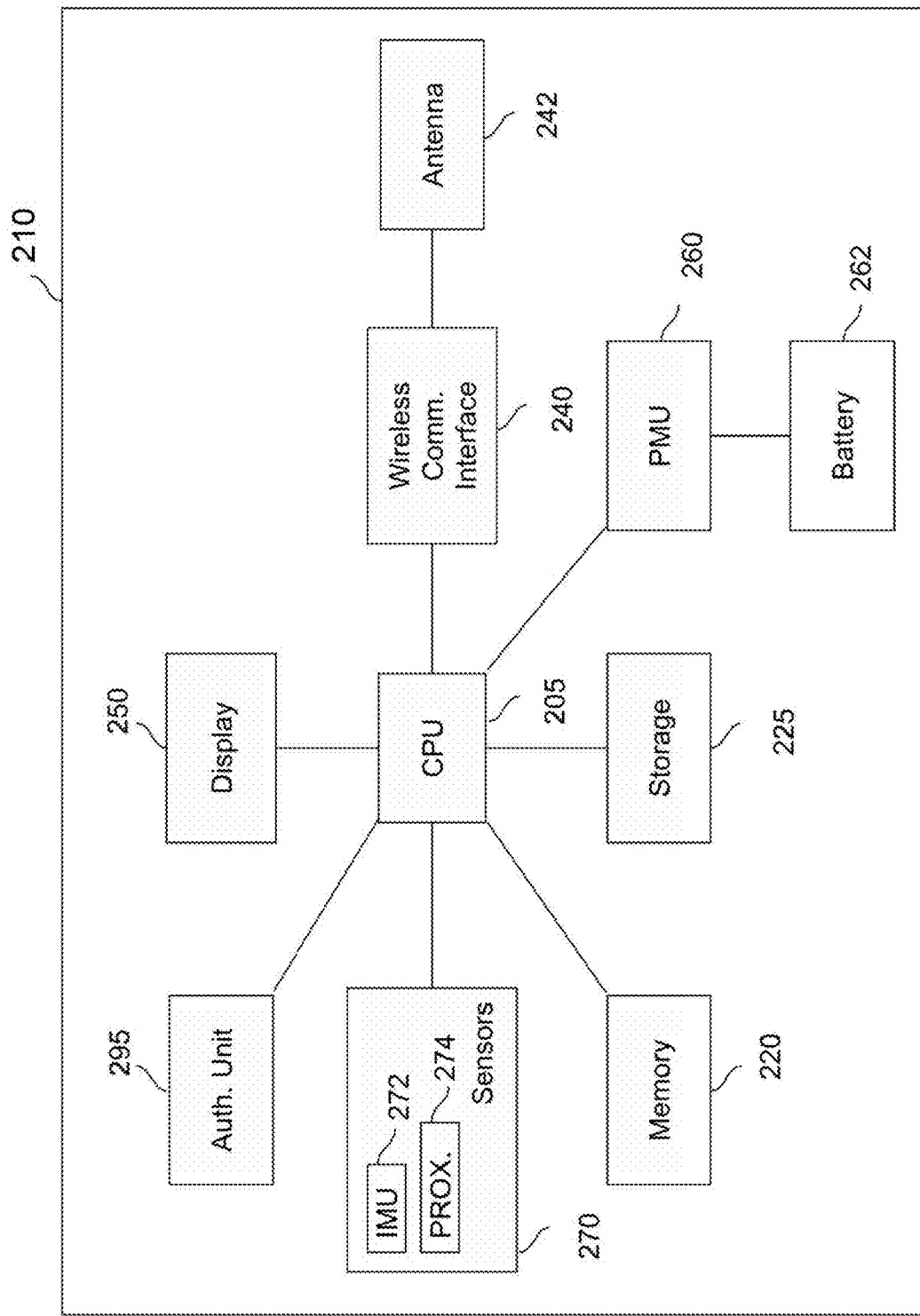
FIG. 2 is a simplified block diagram of a wearable computing device of the system of FIG. 1.

Referring now to FIG. 2, there is illustrated a simplified block diagram of wearable computing device 210. Wearable computing device 210 is one example implementation of a wearable computing device 110 as described with reference to FIG. 1.

Wearable computing device 210 has a processor 205, which is communicatively coupled to a volatile memory 220, a non-volatile memory 225, a wireless data communications interface 240, an antenna 242, an output device 250, a power management unit (PMU) 260, a battery 262, one or more sensors 270 (e.g., inertial motion unit (IMU) 272, proximity sensor 274) and, optionally, an authentication unit 295.

In at least some embodiments, wearable computing device 210 is a computing device such as a head-mounted eyeglasses device.

In some embodiments, wearable computing device 210 may have a peripheral bus interface (not shown) which is used to communicatively couple the processor 205 with other elements of wearable computing device 210. It will be appreciated that FIG. 2 is a simplified diagram of but one example embodiment, and that various other arrangements and computer system architectures may be used.

Processor 205 is a computer processor, such as a general purpose microprocessor or microcontroller. In some other cases, processor 205 may be a field programmable gate array, application specific integrated circuit, microcontroller, or other suitable computer processor.

Processor 205 is coupled, via a computer data bus (not shown), to volatile memory 220 and non-volatile memory 225. Non-volatile memory 225 stores computer programs (e.g., application programs, service programs, drivers, frameworks, etc.) consisting of computer-executable instructions, which may be loaded into volatile memory 220 for execution by processor 205 as needed. It will be understood by those skilled in the art that references herein to a computing device as carrying out a function or acting in a particular way imply that a processor (e.g., processor 205 of wearable computing device 210) is executing instructions (e.g., a software program) stored in a memory and possibly transmitting or receiving inputs and outputs via one or more interface. Volatile memory 220 may also store data input to, or output from, processor 205 in the course of executing the computer-executable instructions.

Processor 205 is also coupled to an output device 250, which outputs information and data as directed by various computer programs executed by wearable computing device 210. For example, output device 250 may be a light emitting diode (LED) or liquid crystal display (LCD) display, a projection device, or a laser-based retinal projection device.

Processor 205 is coupled to wireless data communication interface 240. In at least some embodiments, the wireless data communication interface 240 is a wireless PAN interface, such as a Bluetooth™ interface (e.g., Bluetooth™ 4.2, or earlier, or more recent versions to the extent that such versions are functionally consistent with existing versions) or Bluetooth™ Low Energy (BLE) interface. In some other embodiments, wireless data communication interface 240 may be another wireless interface, such as Wi-Fi™ or a cellular data network interface.

Wireless data communication interface 240 is coupled to a wireless antenna 242, which is used to transmit and receive signals for wireless data communication.

In implementations or embodiments where wearable computing device 210 is a wearable or portable wearable computing device, wearable computing device 210 may be powered by an energy storage unit 262, such as a battery or capacitor. The energy storage unit 262 may be managed (e.g., charged and discharged) under the control of a power management unit (PMU) 260. Power management unit 260 may also be coupled to processor 205, and other elements of wearable computing device 210, to regulate energy usage of those elements. For example, PMU 260 may direct processor 205 to operate at a reduced frequency, or to disable subcomponents, in order to reduce energy usage when the energy or charge level of energy storage unit 262 is low.

Wearable computing device 210 may be equipped with one or more sensors 270, such as an inertial motion unit (IMU) 272, a proximity sensor 274, and other sensors (not shown).

IMU 272 may be an accelerometer-based device, for example, that can detect acceleration—and therefore, orientation—of wearable computing device 210 in 3-dimensional space. Proximity sensor 274 may be used, for example, to determine when wearable computing device 210 is in close proximity to some object, such as a user's head, for example.

Authentication unit 295 may be used in some circumstances to support processor 205 when communicating with external devices that call for an embedded element or chip for authentication. In such cases, processor 205 may communicate with authentication unit 295 to obtain the desired authentication data.

In some embodiments, processor 205 may be coupled to a peripheral bus interface via a data bus. In other embodiments, a peripheral bus interface may be omitted and processor 205 may be coupled to other elements of wearable computing device 210 via a direct link.

Figure 3:
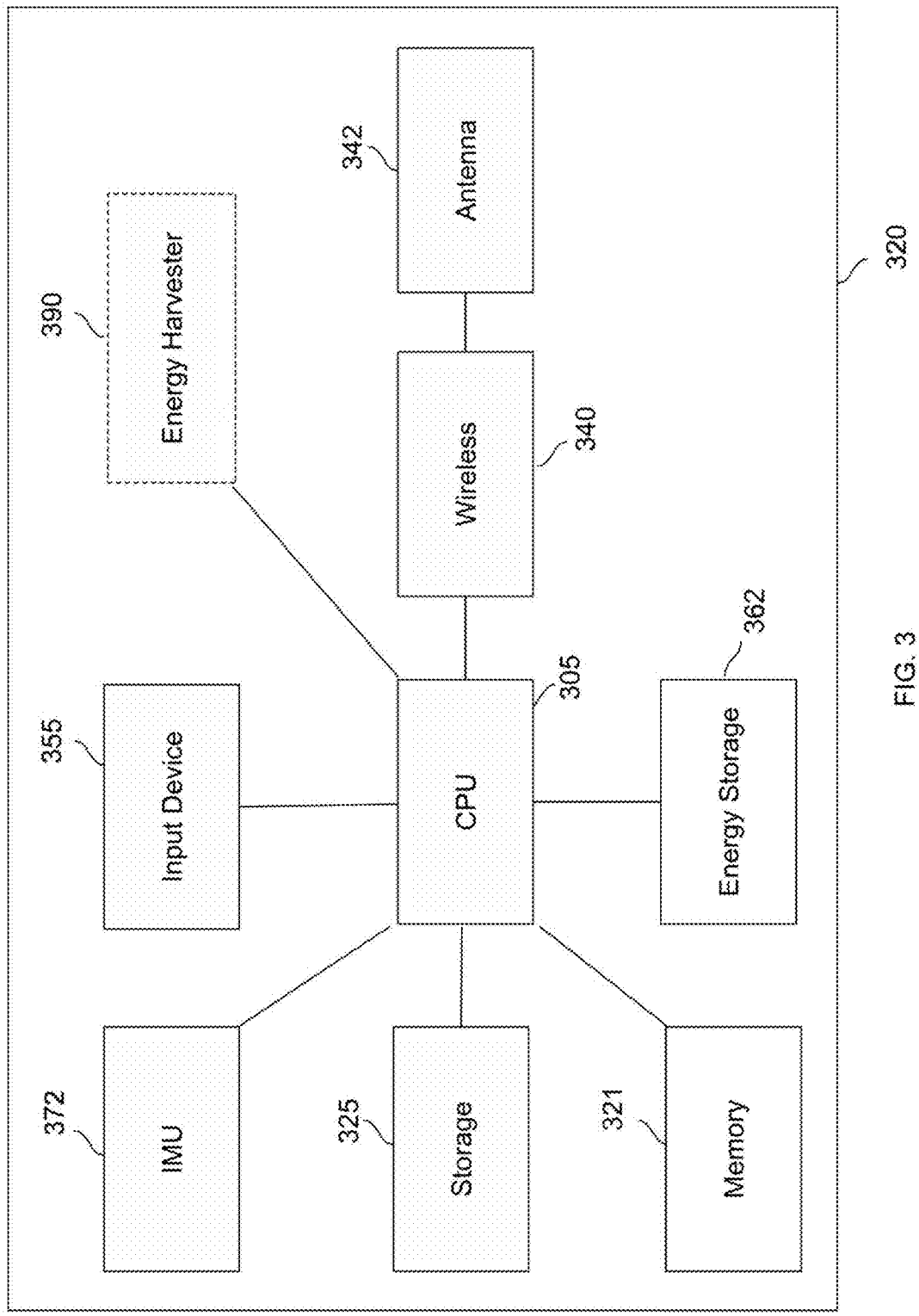
FIG. 3 is a simplified block diagram of a controller device of the system of FIG. 1.

Referring now to FIG. 3, there is illustrated a simplified block diagram of controller device 320. Controller device 320 is one example implementation of a controller device 120 as described with reference to FIG. 1.

Controller device 320 has a processor 305, which is communicatively coupled to a volatile memory 321, a non-volatile memory 325, a wireless data communications interface 340, an antenna 342, an input device 355, an energy storage unit 362, an IMU 372 and, optionally, an energy harvester 390.

Figure 10A:
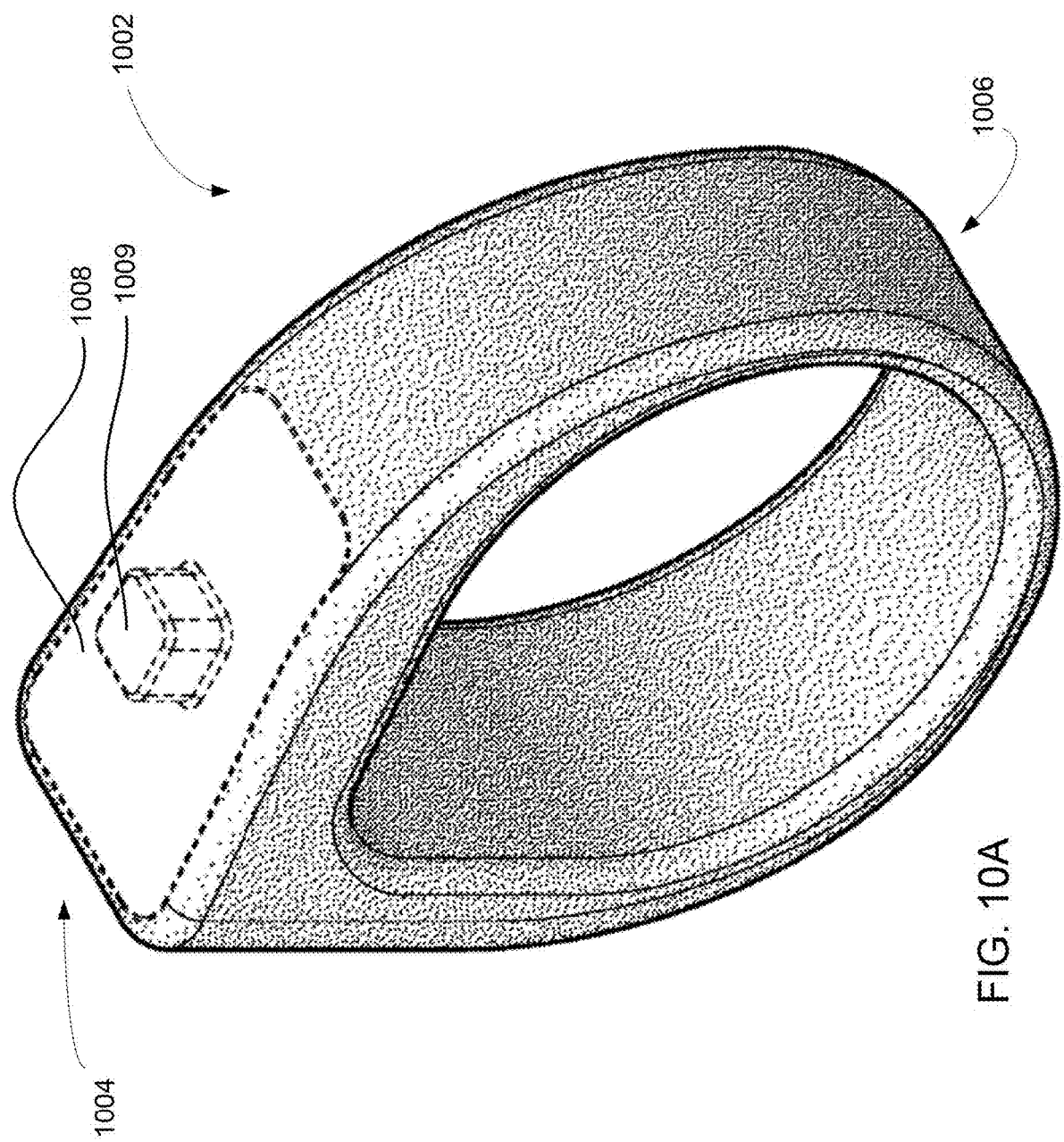
FIGS. 10A and 10B are perspective views of a controller device in accordance with some embodiments.
Figure 10B:
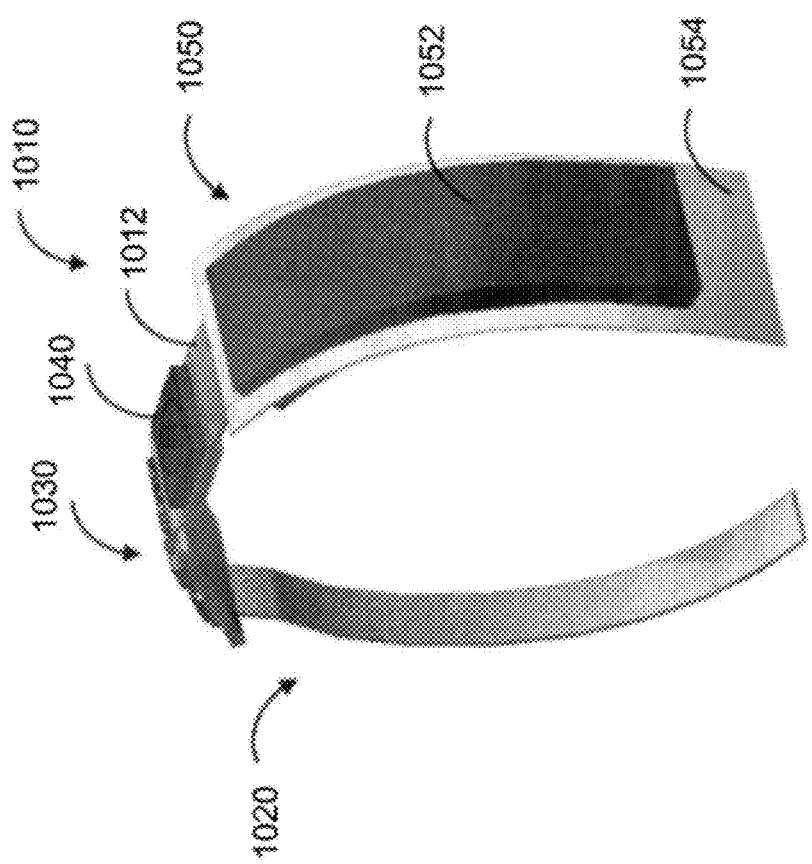
Figure 10C:
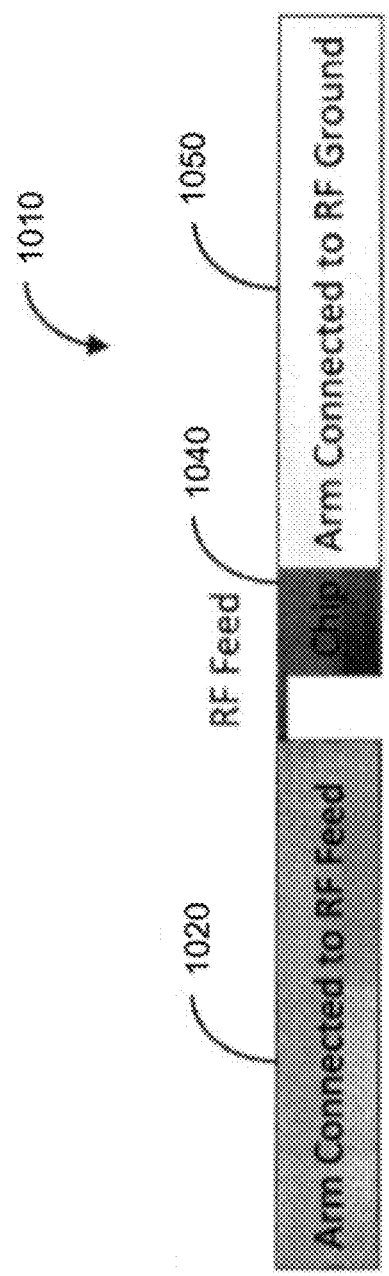
FIG. 10C is a block diagram of an electronic circuit housed within the controller device of FIGS. 10A and 10B.

In at least some embodiments, controller device 320 is a wearable device, such as a ring device as described herein with respect to FIGS. 10A to 10C.

In some implementations or embodiments, controller device 320 may be an integrated system in a single chip or package. It will be appreciated that FIG. 3 is a simplified diagram of but one example embodiment, and that various other arrangements and computer system architectures may be used.

Processor 305 is a computer processor, such as a microcontroller or general purpose microprocessor. In some other cases, processor 305 may be a field programmable gate array, application specific integrated circuit, or other suitable computer processor.

Processor 305 is coupled to volatile memory 321 and non-volatile memory 325, such as an EEPROM element. Non-volatile memory 325 stores at least one computer program (e.g., firmware) consisting of computer-executable instructions, which may be loaded into volatile memory 321 for execution by processor 305 as needed. It will be understood by those skilled in the art that references herein to a controller device as carrying out a function or acting in a particular way imply that a processor (e.g., processor 305 of controller device 320) is executing instructions (e.g., a software program) stored in a memory and possibly transmitting or receiving inputs and outputs via one or more interface. Volatile memory 321 may also store data input to, or output from, processor 305 in the course of executing the computer-executable instructions.

Processor 305 is also coupled to an input device 355, which generates and transmits signals representative of user inputs to various computer programs executed by controller device 320. For example, input device 355 may be a button, a touch pad, some other suitable input, or some combination of input devices.

Processor 305 is coupled to wireless data communication interface 340. In at least some embodiments, the wireless data communication interface 340 is a low energy wireless PAN interface, such as a Bluetooth™ Low Energy (BLE) interface. In some other embodiments, wireless data communication interface 340 may be another wireless interface, such as standard Bluetooth™, Wi-Fi™ or a cellular data network interface.

Wireless data communication interface 340 is coupled to a wireless antenna 342, which is used to transmit and receive signals for wireless data communication.

Controller device 320 may be powered by an energy storage unit 362, such as a battery or capacitor. In some embodiments, the energy storage unit 362 may be charged by an energy harvester 390. For example, energy harvester 390 may convert mechanical motion of controller device 320 into electrical charge that can be stored in energy storage unit 362, or may convert solar energy into electrical charge that can be stored in energy storage unit 362.

Controller device 320 may be equipped with one or more sensors, such as an inertial motion unit (IMU) 372. IMU 372 may be an accelerometer-based device, for example, that can detect acceleration—and therefore, orientation—of controller device 320 in 3-dimensional space.

Figure 4:
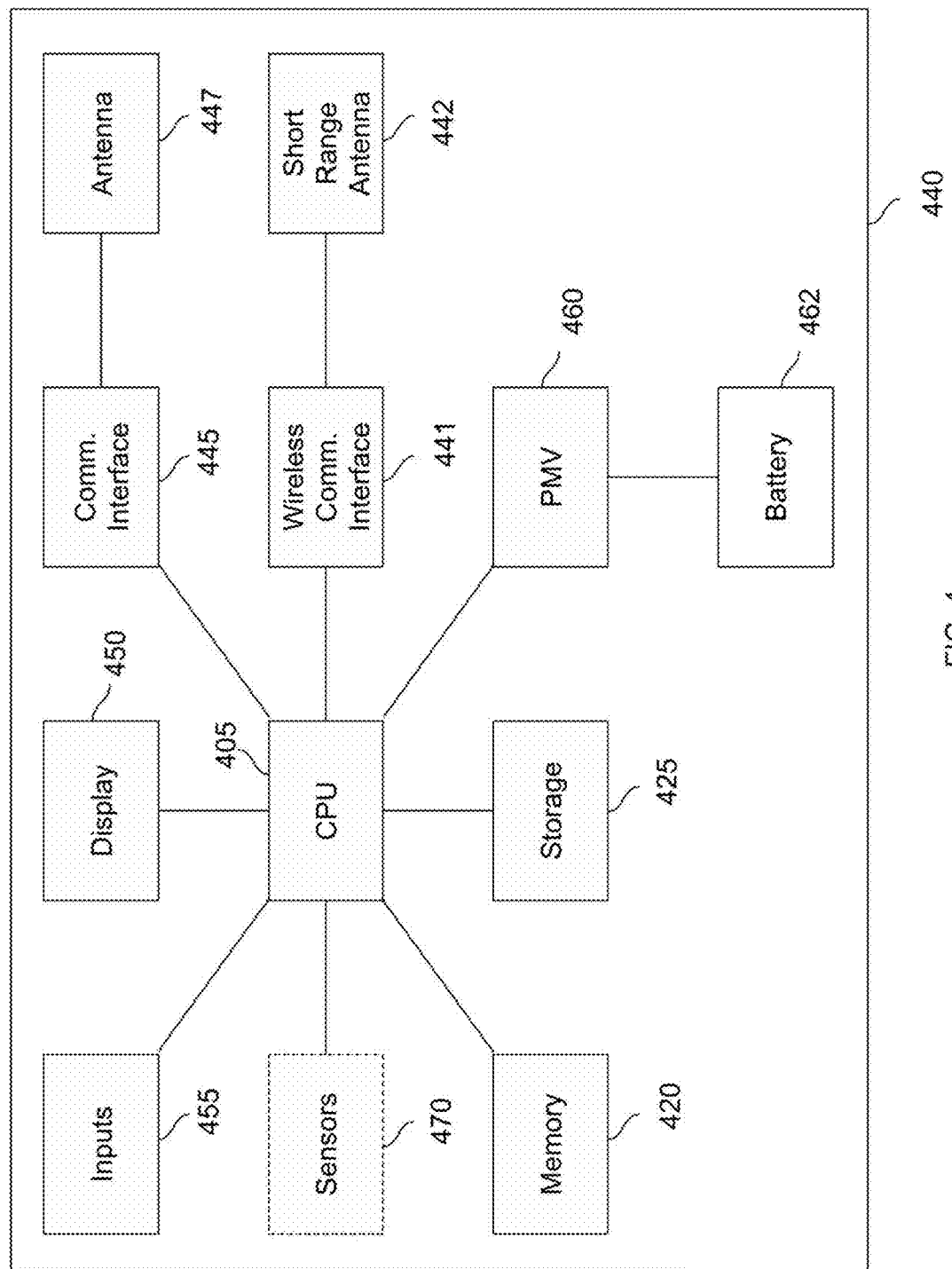
FIG. 4 is a simplified block diagram of a host computing device of the system of FIG. 1.

Referring now to FIG. 4, there is illustrated a simplified block diagram of host computing device 440. Host computing device 440 is one example implementation of a host computing device 140 as described with reference to FIG. 1.

Host computing device 440 has a processor 405, which is communicatively coupled to a volatile memory 420, a non-volatile memory 425, one or more input devices 455, one or more output devices 450, a power management unit (PMU) 460, a battery 462, one or more sensors 470, a short-range wireless data communications interface 441, a short-range antenna 442, a data communications interface 445 and an antenna 447.

In at least some embodiments, host computing device 440 is a mobile computing device, such as a smart phone or tablet device. In some embodiments, host computing device 440 may also be a wearable device. In some embodiments, host computing device 440 may be a non-portable computing device, such as a personal computer, a computer server, a wireless base station or router, or the like.

In some embodiments, host computing device 440 may have a peripheral bus interface (not shown) which is used to communicatively couple the processor 405 with other elements of host computing device 440. It will be appreciated that FIG. 4 is a simplified diagram of but one example embodiment, and that various other arrangements and computer system architectures may be used.

Processor 405 is a computer processor, such as a general purpose microprocessor or microcontroller. In some other cases, processor 405 may be a field programmable gate array, application specific integrated circuit, microcontroller, or other suitable computer processor.

Processor 405 is coupled, via a computer data bus (not shown), to volatile memory 420 and non-volatile memory 425. Non-volatile memory 425 stores computer programs (e.g., application programs, service programs, drivers, frameworks, etc.) consisting of computer-executable instructions, which may be loaded into volatile memory 420 for execution by processor 405 as needed. It will be understood by those skilled in the art that references herein to a computing device as carrying out a function or acting in a particular way imply that a processor (e.g., processor 405 of computing device 440) is executing instructions (e.g., a software program) stored in a memory and possibly transmitting or receiving inputs and outputs via one or more interface. Volatile memory 420 may also store data input to, or output from, processor 405 in the course of executing the computer-executable instructions.

Processor 405 is also coupled to one or more output device 450, which outputs information and data as directed by various computer programs executed by host computing device 440. For example, output device 450 may be a light emitting diode (LED) or liquid crystal display (LCD) display, an audio speaker, a vibration motor, etc.

Processor 405 is coupled to a short-range wireless data communication interface 441. In at least some embodiments, the short-range wireless data communication interface 441 is a wireless PAN interface, such as a Bluetooth™ interface (e.g., Bluetooth™ 4.2, or earlier, or more recent versions to the extent that such versions are functionally consistent with existing versions) or Bluetooth™ Low Energy (BLE) interface. In some other embodiments, short-range wireless data communication interface 441 may be another wireless interface, such as Wi-Fi™ or a cellular data network interface.

Short-range wireless data communication interface 441 is coupled to a wireless antenna 442, which is used to transmit and receive signals for short-range wireless data communication.

Processor 405 may also be coupled to a data communication interface 445. In at least some embodiments, the data communication interface 445 is a wireless cellular data network interface, such as GSM, EDGE, UMTS, LTE, 5G systems and the like. In some other embodiments, data communication interface 441 may be another wireless interface, such as Wi-Fi™. In some embodiments, data communication interface 441 may be a fixed data communication interface, such as an IEEE 802.3 interface (e.g., Ethernet).

In embodiments where data communication interface 445 is a wireless communication interface, it may be coupled to an antenna 447, which can be used to transmit and receive signals for wireless data communication.

In implementations or embodiments where host computing device 440 is a portable computing device, host computing device 440 may be powered by an energy storage unit 462, such as a battery or capacitor. The energy storage unit 462 may be managed (e.g., charged and discharged) under the control of a PMU 460. PMU 460 may also be coupled to processor 405, and other elements of host computing device 440, to regulate energy usage of those elements. For example, PMU 440 may direct processor 405 to operate at a reduced frequency, or to disable subcomponents, in order to reduce energy usage when the energy or charge level of energy storage unit 462 is low.

Host computing device 440 may be equipped with one or more sensors 470, such as an IMU, a proximity sensor, or both.

In some implementations or embodiments, processor 405 may be coupled to a peripheral bus interface via a data bus. In other embodiments, a peripheral bus interface may be omitted and processor 405 may be coupled to other elements of host computing device 440 via a direct link.

Figure 5:
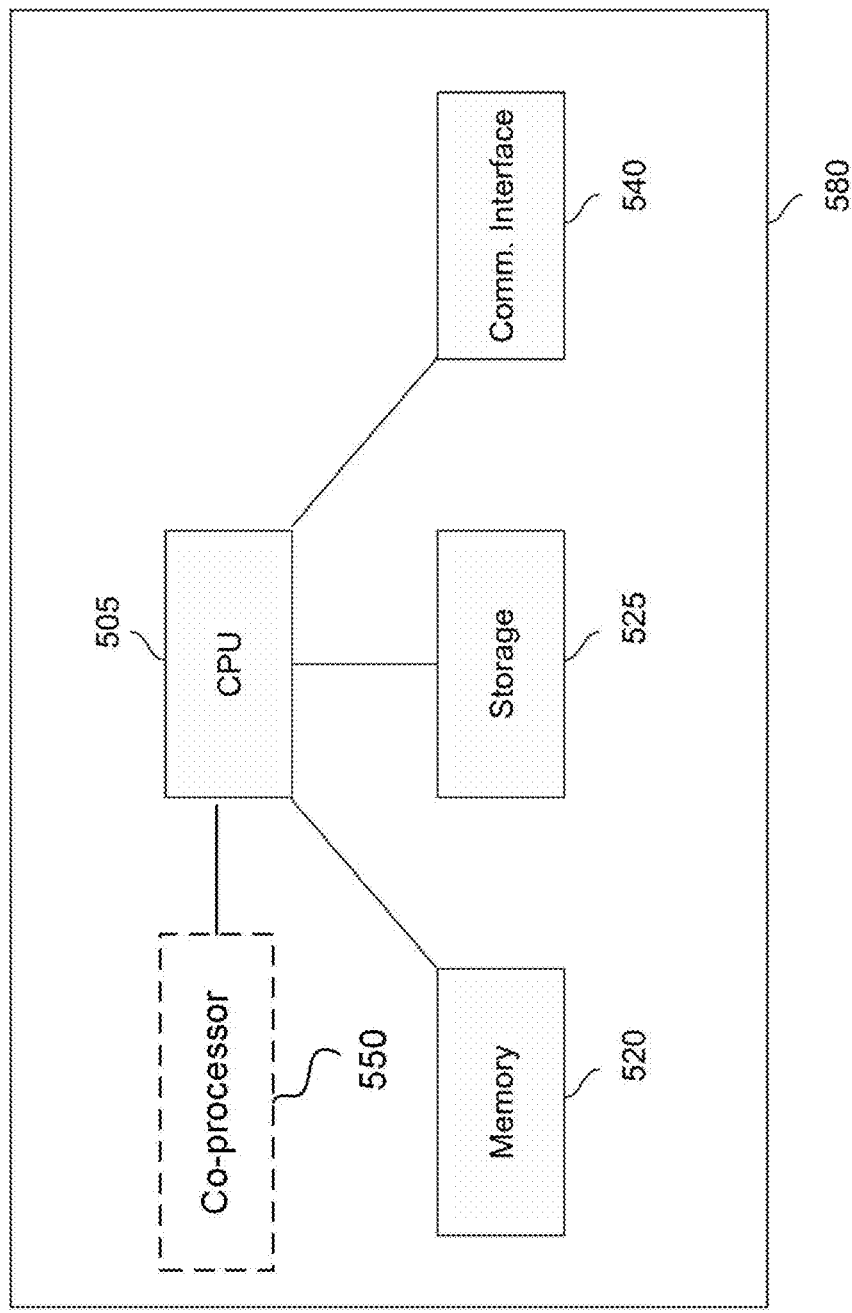
FIG. 5 is a simplified block diagram of a remote computing device of the system of FIG. 1.

Referring now to FIG. 5, there is illustrated a simplified block diagram of remote computing device 580. Remote computing device 580 is one example implementation of a remote computing device 180 as described with reference to FIG.

Remote computing device 580 has a processor 505, which is communicatively coupled to a volatile memory 520, a non-volatile memory 525, and a data communications interface 540.

In some implementations or embodiments, remote computing device 580 may also have a co-processor 550. Co-processor 550 may be one or more microprocessor, ASIC, field programmable gate array (FPGA) and/or graphics processing unit (GPU), which may contain specialized processing hardware to perform certain tasks that may otherwise be performed by processor 505. For example, in some cases, co-processor 550 may be a GPU that is configured to perform stream processing for certain computing tasks with a high degree of compute intensity, parallelism and/or data locality.

In at least some implementations or embodiments, remote computing device 580 is a computer server, which may be provided in a data center, or as part of a cloud computing environment.

In some implementations or embodiments, remote computing device 580 may have a peripheral bus interface (not shown) which is used to communicatively couple the processor 505 with other elements of remote computing device 580. It will be appreciated that FIG. 5 is a simplified diagram of but one example embodiment, and that various other arrangements and computer system architectures may be used. Description of other elements of the remote computing device 580 are omitted to aid exposition.

Processor 505 is a computer processor, such as a general purpose microprocessor. In some other cases, processor 505 may be a field programmable gate array, application specific integrated circuit, microcontroller, or other suitable computer processor.

Processor 505 is coupled, via a computer data bus (not shown), to volatile memory 520 and non-volatile memory 525. Non-volatile memory 525 stores computer programs (e.g., application programs, service programs, drivers, frameworks, etc.) consisting of computer-executable instructions, which may be loaded into volatile memory 520 for execution by processor 505 as needed. It will be understood by those skilled in the art that references herein to a computing device as carrying out a function or acting in a particular way imply that a processor (e.g., processor 505 of computing device 580) is executing instructions (e.g., a software program) stored in a memory and possibly transmitting or receiving inputs and outputs via one or more interface. Volatile memory 520 may also store data input to, or output from, processor 505 in the course of executing the computer-executable instructions.

Processor 505 is coupled to a data communication interface 540. In at least some embodiments, the data communication interface 540 is an IEEE 802.3 interface (e.g., Ethernet) or other data communication interface.

In some embodiments, processor 505 may be coupled to a peripheral bus interface via a data bus. In other embodiments, a peripheral bus interface may be omitted and processor 505 may be coupled to other elements of remote computing device 580 via a direct link.

Figure 6A:
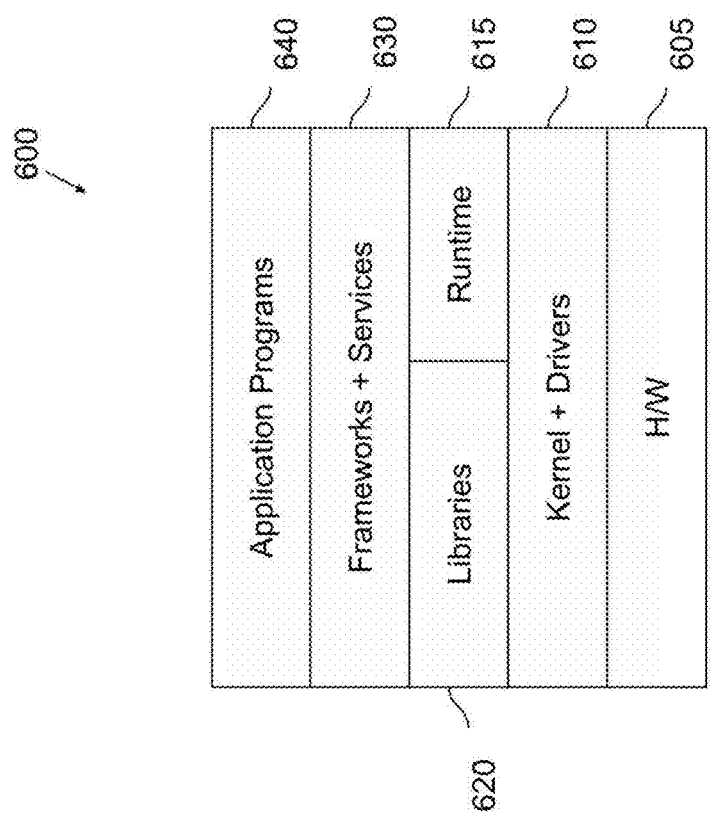
FIG. 6A is a schematic block diagram of an example platform architecture implemented by a wearable computing device in accordance with some embodiments.

Referring now to FIG. 6A, there is illustrated a schematic block diagram of an example platform architecture implemented by a wearable computing device, such as wearable computing device 110 of FIG. 1 and wearable computing device 210 of FIG. 2. Platform architecture 600 is represented by a "stack" in which successive layers represent increasing levels of abstraction from a bottom physical layer.

Platform architecture 600 has a physical or hardware layer 605, which represents the various physical resources of the wearable computing device, such as a processor, communication interfaces, storage devices, etc. For example, the physical resources of wearable computing device 210 described in FIG. 2 may form the hardware layer 605 of the platform in some embodiments.

Platform architecture 600 further has a low-level layer 610, which represents the operating system kernel and device driver software. The kernel represents a lowest-level of abstraction and performs various functions, such as resource management, memory management, device management, and handling of system calls for other programs. For example, the kernel may be responsible for mediating accessing to the wearable computing device's physical resources found in the hardware layer 605. In some embodiments, the kernel may be a Linux kernel, and the device drivers may be provided for the processor, communication interfaces, storage devices, PMU, etc. Device drivers may be integrated into the kernel (e.g., in a "monolithic" kernel), or may be loadable modules that can be dynamically loaded or unloaded by the kernel as desired.

Platform architecture 600 has a further library layer. Libraries 620 represent system libraries that can be used to carry out core functions of an operating system. Libraries 620 are collections of software functions that can be called by various application programs, frameworks and services. In some cases, libraries 620 may be shared libraries that can be called by a wide variety of different software. For example, shared libraries may include functions for process creation and control, networking, file manipulation, and other routine functions.

In some implementations or embodiments, platform architecture 600 may have a run-time environment 615. Run-time environment 615 may employ just-in-time compilation or ahead-of-time compilation. For example, run-time environment 615 may be an implementation of the Android Runtime (ART) used by the Android operating system, in which case platform architecture 600 may substantially resemble that of the Android operating system.

Platform architecture 600 has a further frameworks and services layer 630. Frameworks are software collections that provide a higher-level of abstraction than lower level system libraries, in order to provide some application-specific functions. One example of a framework is the Qt application framework, developed by The Qt Company™, which may be used to develop and implement cross-platform applications and user interfaces.

Services are software programs that may execute autonomously without direct user interaction, for example, without a graphical user interface and as background operations. Services may provide functionality such as storage indexing, power monitoring, logging, networking, and more.

Each of layers 610, 615, 620, 630 and 640 may be implemented in whole or in part as computer-readable program code that can be executed by a processor, such as processor 205 of wearable computing device 210.

Platform architecture 600 has a further application layer 640. Application layer 640 is defined by software application programs, such as interactive programs that accept input from, and produce output for presentation to, a user of the wearable computing device.

Figure 6B:
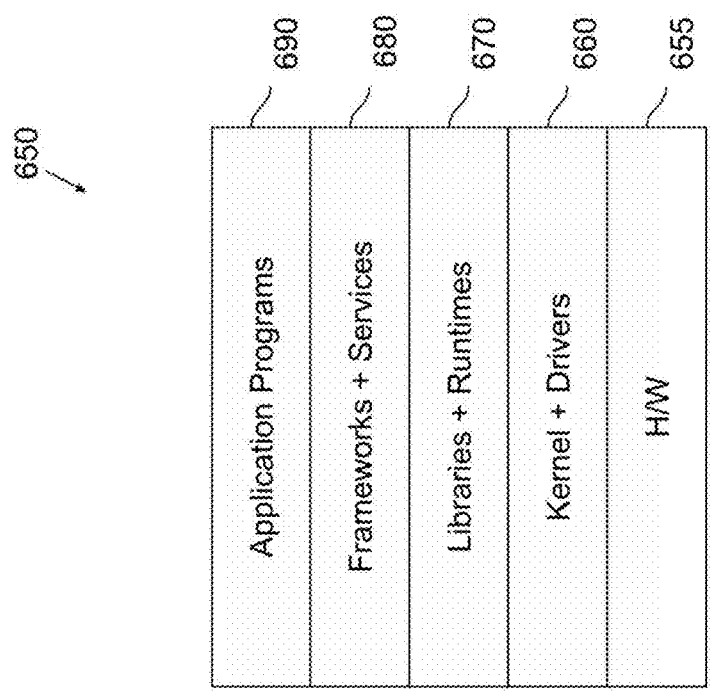
FIG. 6B is a schematic block diagram of an example platform architecture implemented by a host computing device in accordance with some embodiments.

Referring now to FIG. 6B, there is illustrated a schematic block diagram of an example platform architecture implemented by a host computing device, such as host computing device 140 of FIG. 1 and host computing device 440 of FIG. 4. As with platform architecture 600, platform architecture 650 is represented by a "stack" in which successive layers represent increasing levels of abstraction from a bottom physical layer.

Platform architecture 650 has a physical or hardware layer 655, which represents the various physical resources of the host computing device, such as a processor, communication interfaces, storage devices, etc. For example, the physical resources of host computing device 440 described in FIG. 4 may form the hardware layer 655 of the platform in some embodiments.

Platform architecture 650 further has a low-level layer 660, which represents the operating system kernel and device driver software. The kernel represents a lowest-level of abstraction and performs various functions, such as resource management, memory management, device management, and handling of system calls for other programs. For example, the kernel may be responsible for mediating accessing to the host computing device's physical resources found in the hardware layer 655. In some embodiments, the kernel may be a Linux kernel, and the device drivers may be provided for the processor, communication interfaces, storage devices, PMU, etc. Device drivers may be integrated into the kernel (e.g., in a "monolithic" kernel), or may be loadable modules that can be dynamically loaded or unloaded by the kernel as desired.

Platform architecture 650 has a further library layer. Libraries 670 represent system libraries that can be used to carry out core functions of an operating system. Libraries 670 are collections of software functions that can be called by various application programs, frameworks and services. In some cases, libraries 670 may be shared libraries that can be called by a wide variety of different software. For example, shared libraries may include functions for process creation and control, networking, file manipulation, and other routine functions. If the platform architecture 650 is for an Android-based system, libraries 670 may include the Android Architecture Components.

In some embodiments, platform architecture 650 may have a run-time environment (not shown separately). The run-time environment may employ just-in-time compilation or ahead-of-time compilation. For example, in some embodiments, a run-time environment may be provided that is an implementation of the Android Runtime (ART) used by the Android operating system, in which case platform architecture 650 may be, or substantially resemble that of, the Android operating system.

In some implementations or embodiments, the platform architecture 650 may have a run-time environment that implements a virtual machine, in which case the run-time environment translates application code from platform-independent bytecode into native machine code executable by the processor of hardware layer 655. In other implementations or embodiments, the platform architecture 650 may omit the virtual machine, in which case programs may be compiled into machine code for native execution by a processor of the host computing device, without the need for intermediate bytecode.

Platform architecture 650 has a further frameworks and services layer 680. Frameworks are software collections that provide a higher-level of abstraction than lower level system libraries, in order to provide some application-specific functions. If the platform architecture 650 is for an Android-based operating system, one example of a framework is the Java Application Programming Interface (API) framework, which may be used to develop and implement applications and user interfaces for the Android operating system. Similarly, if the platform architecture 650 is for an Apple iOS™ operating system, an example framework may be UIKit.

Services are software programs that may execute autonomously without direct user interaction, for example, without a graphical user interface and as background operations. Services may provide functionality such as storage indexing, power monitoring, logging, networking, and more.

Platform architecture 650 has a further application layer 690. Application layer 690 is defined by software application programs, such as interactive programs that accept input from, and produce output for presentation to, a user of the host computing device. In some embodiments, application layer 690 may have one or more applications configured to communicate with wearable computing device 110; application layer 690 may also have one or more applications unrelated to wearable computing device 110 (e.g., productivity applications, games, etc.)

Each of layers 660, 670, 680 and 690 may be implemented in whole or in part as computer-readable program code that can be executed by a processor, such as processor 405 of host computing device 440.

Figure 7:
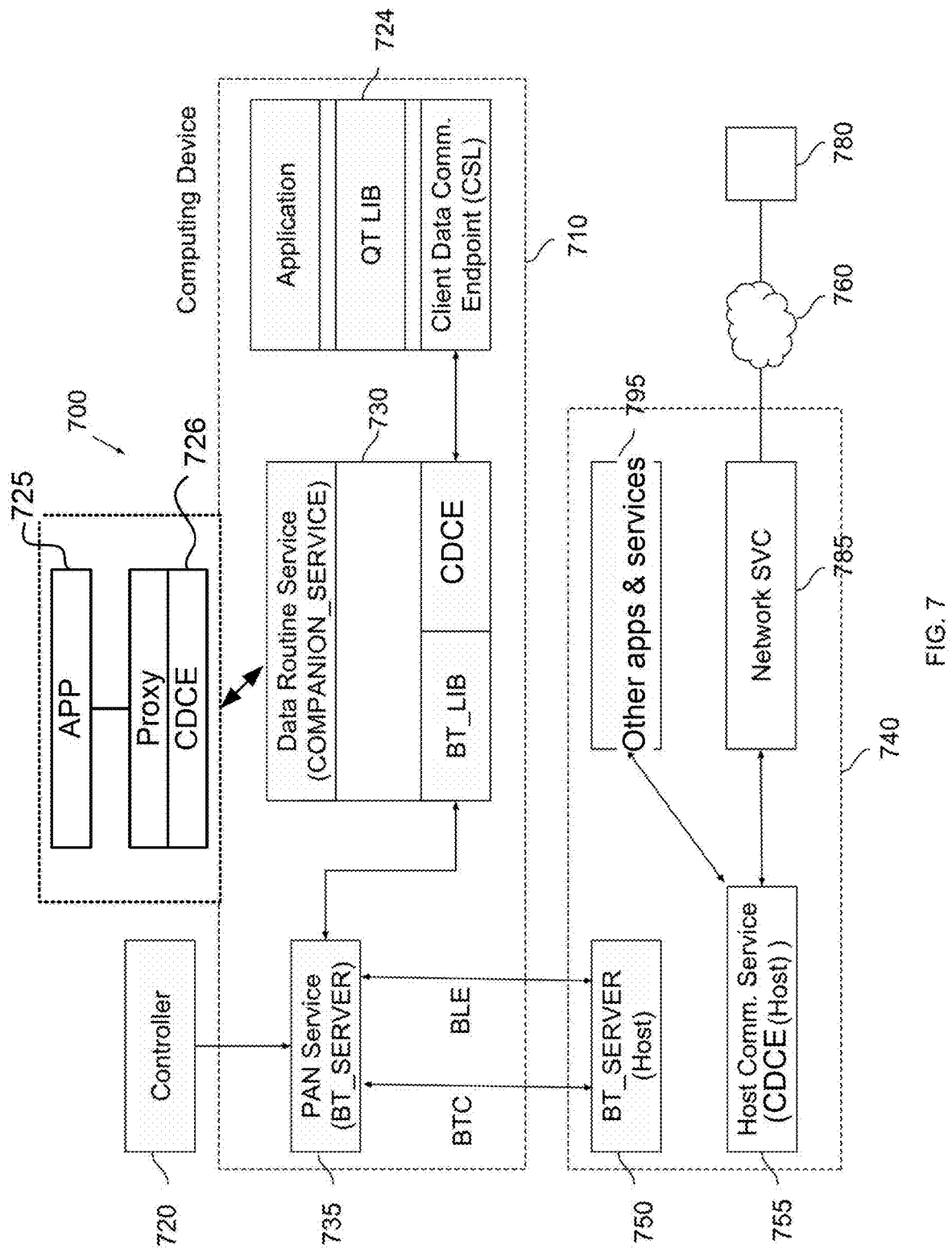
FIG. 7 is a schematic block diagram of an example delegated network access system for a wearable device in accordance with some embodiments.

Referring now to FIG. 7, there is illustrated a schematic block diagram of an example delegated network access system for a wearable device. System 700 generally has a wearable computing device 710—which may be an implementation of wearable computing device 110 of FIG. 1 or wearable computing device 210 of FIG. 2, with a platform architecture as described with reference to FIG. 6A—and a host computing device 740—which may be an implementation of host computing device 140 of FIG. 1 or host computing device 440 of FIG. 4, with a platform architecture as described with reference to FIG. 6B.

Since wearable computing device 710 is equipped with only a personal area network interface, software programs executed by wearable computing device 710 that desire data communications (e.g., with remote computing device 180) may create data packets using a specialized communications library, also called a companion service library, which allows for initial transmission of data via the personal area network interface to the host computing device 740; the host computing device 740 can receive these data transmissions and, using the companion service library, re-transmit them to the network on behalf of the wearable computing device 710. Likewise, host computing device 740 can receive transmissions from the network for delivery to wearable computing device 710.

Wearable computing device 710 may have a controller device 720, such as controller device 120 of FIG. 1. Similarly, host computing device 740 may connect to a network 760, such as network 160 of FIG. 1, and a remote computing device 780, such as remote computing device 180 of FIG. 1.

Host computing device 740 can provide a number of services that are executed by a processor of the host computing device 740. In particular, host computing device 740 may have a host personal area network service 750, a host routing service 755, and a network service 785. Host computing device 740 may also have a variety of other applications and services, shown here as 795 and described elsewhere herein.

The host routing service 755 operates to receive data from the host personal area network service 750, decode or de-encapsulate the data, determine a destination on a network, format or encapsulate the data for transmission via the network, and forward the encapsulated data to the network service 785 for eventual transmission via the network.

Similarly, the host routing service 755 operates to receive "reply" data from network service 785, decode or de-encapsulate the reply data, determine a destination on the personal area network, format or encapsulate the reply data for transmission via the personal area network, and forward the encapsulated reply data to the host personal area network service 750 for eventual transmission via the personal area network. Data routing service 730 of wearable computing device 710 may, upon receiving the reply data, determine which application or service is the intended recipient and forward the reply data accordingly.

Generally, host routing service 755 may implement a host data communications endpoint by calling functions from the companion service library to handle data routing to or from the host device. As noted above, a corresponding companion service library may also be used by the client data communications endpoint in application 724 or proxy service 726. A data routing service 730 of wearable computing device 710 may also make use of the companion service library.

Generally, the companion service library may have related server and client libraries.

The client library may have of a set of APIs and functions that act as an abstraction layer for a subset of the common Portable Operating System Interface (POSIX) Transmission Control Protocol (TCP) networking functions. Specifically, the client library may provide APIs and functions for creating, binding, opening and closing TCP sockets, as well as performing Domain Name System (DNS) queries and domain name resolution. Using the client library functions, the abstracted, open, TCP connections can be emulated with local UNIX domain sockets, which are functionally equivalent at the application layer.

The server library may have a set of APIs, functions and callbacks that can be used to provide a server thread to autonomously manage the connection lifecycle and communications between the various applications or proxy servers that implement client data communication endpoints, and the data routing service 730, which integrates with the server library. The API of the server library facilitates client remote procedure call (RPC) calls for TCP socket operations, as requested by the clients. The callbacks and callouts allow the data routing service 730 to frame RPC requests and socket data when sending it to the host computing device 740, and de-frame command responses and socket data coming from the host computing device 740 before returning it to the client application via the companion service library functions.

In the case of data routing service 730, the server library API functions may be used to frame or de-frame client RPC calls using a protocol buffer messaging protocol, which can be common to both the wearable computing device 710 and host computing device 740.

Host personal area network service 750 operates to receive and transmit data over the wireless interface (e.g., wireless communication interface 441 of host computing device 440) and between host routing service 755 and other applications and services of host computing device 740. In particular, host personal area network service 750 may communicate with a personal area network service 735 of wearable computing device 710 via a general personal area network (e.g., Bluetooth™) or over a low-power personal area network (e.g., Bluetooth™ LE), or both. In some cases, the personal area network service determines which of the general personal area network and low-power personal area network to use for each data packet it transmits, based on a type of the data packet or a session type.

Similarly, network service 785 operates to receive and transmit data over the network interface (e.g., communication interface 445 of host computing device 440) and between host routing service 755 and other applications and services of host computing device 740.

As noted, wearable computing device 710 has a personal area network service 735, a data routing service 730, an application 724 and a proxy service 726.

Application 724 may be a software application that is interactive and therefore makes use of a framework such as Qt, and implements a client data communications endpoint for networked communication via host computing device 740. In particular, the client data communications endpoint allows the application to exchange one or more data messages with data routing service 730 for eventual transmission (or reception) via host computing device 740.

In some cases, the wearable computing device may be provided with applications or frameworks 725 that are not configured or programmed to directly make use of a client data communications endpoint. For example, the applications 725 may be legacy applications or provided by a third-party, and therefore are not configured to take advantage of the client data communications endpoint. In such cases, a proxy service 726 may be provided. Proxy service 726 can be a system service of the wearable computing device that has an instance of the client data communications endpoint (CSL), coupled with a proxy server implementation, which may be bound to a local domain socket. The proxy server implementation may be, for example, an HTTP 1.1 CONNECT method proxy. Accordingly, proxy server 726 implements a client data communications endpoint for networked communication via host computing device 740. In particular, the client data communications endpoint allows certain applications to exchange one or more data messages with data routing service 730 for eventual transmission (or reception) via host computing device 740, even when the application itself is not specifically configured for the client data communications endpoint.

In operation, an application or framework can be configured to use the proxy server to connect to the locally-bound proxy service 726. This allows the application or framework establish an HTTP tunnel, or a secure HTTPS tunnel, to the network 160, via data routing service 750, while abstracting all details of the wearable computing device's PAN and client data communications endpoint away from the application.

Data routing service 730 implements functions from the communications library to provide an intermediate communications node that receives the one or more data messages from the client data communications endpoint, encapsulates the one or more data messages, and routes the one or more data messages to the host data communications endpoint of host routing service 755 via the personal area network service 735, or vice versa.

The client data communications endpoint may implement a socket interface, such as local UNIX domain sockets or TCP sockets or, in at least some embodiments, a hybrid socket interface that allows for both local UNIX domain sockets and/or TCP sockets in a single interface.

The host data communications endpoint may implement a corresponding socket interface, enabling sockets opened by an application program 724 or proxy service 726 of wearable computing device 710 to have endpoints on wearable computing device 710 and host computing device 740.

Personal area network service 735 interacts with a wireless communication interface to communicatively couple the data routing service and the host routing service via a general or low-power personal area network. The general PAN may be, for example, a Bluetooth™ PAN. The low-power PAN may be, for example, a Bluetooth™ LE PAN.

Controller device 720 is generally capable of communicating with the wearable computing device 710 via a low-power personal area network. Personal area network service 735 receives one or more control messages from the controller device 720 via the low-power personal area network and relays the one or more control messages to the data routing service, which can transmit the one or more control messages to an application program or service, where it can be interpreted as input.

As described elsewhere herein, the host computing device can assist the wearable computing device to communicate over a network, such as the Internet, by routing communications received over a personal area network to the network, and vice versa.

However, in some cases, the personal area network connection for some devices may be periodic or time-limited. For example, the host computing device, or the wearable computing device, or both, may periodically disable their personal area network interfaces, e.g., to conserve battery.

In some cases, the operating system of the host computing device may force disablement of the personal area network interface, for example, because of restrictions on the host communications service. In such cases, the wearable computing device may attempt to establish personal area network connection by taking advantage of a low-power personal area network, which may be more readily available. However, in many cases, the low-power personal area network may not be suitable for sustained connections and data transmission due to, e.g., lower data rates than a general personal area network connection. At least some of the described embodiments illustrate methods for allowing the wearable computing device to first initiate a low-power personal area network link, and then use this link to call for the host computing device to enable its general personal area network interface for subsequent linking.

Figure 8A:
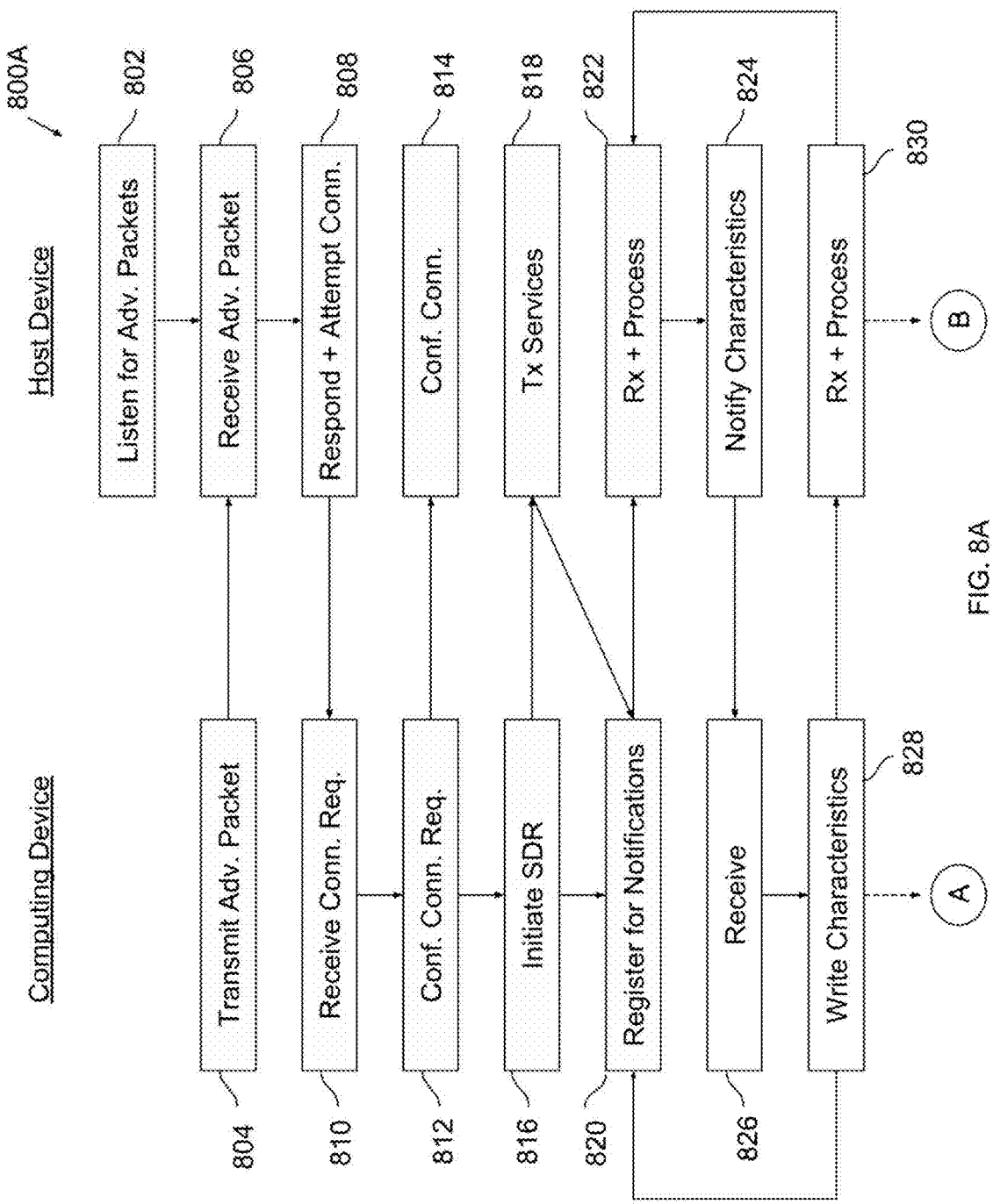
FIG. 8A is a simplified process flow diagram of a method of wirelessly coupling a wearable computing device to a host computing device in accordance with some embodiments.
Figure 8B:
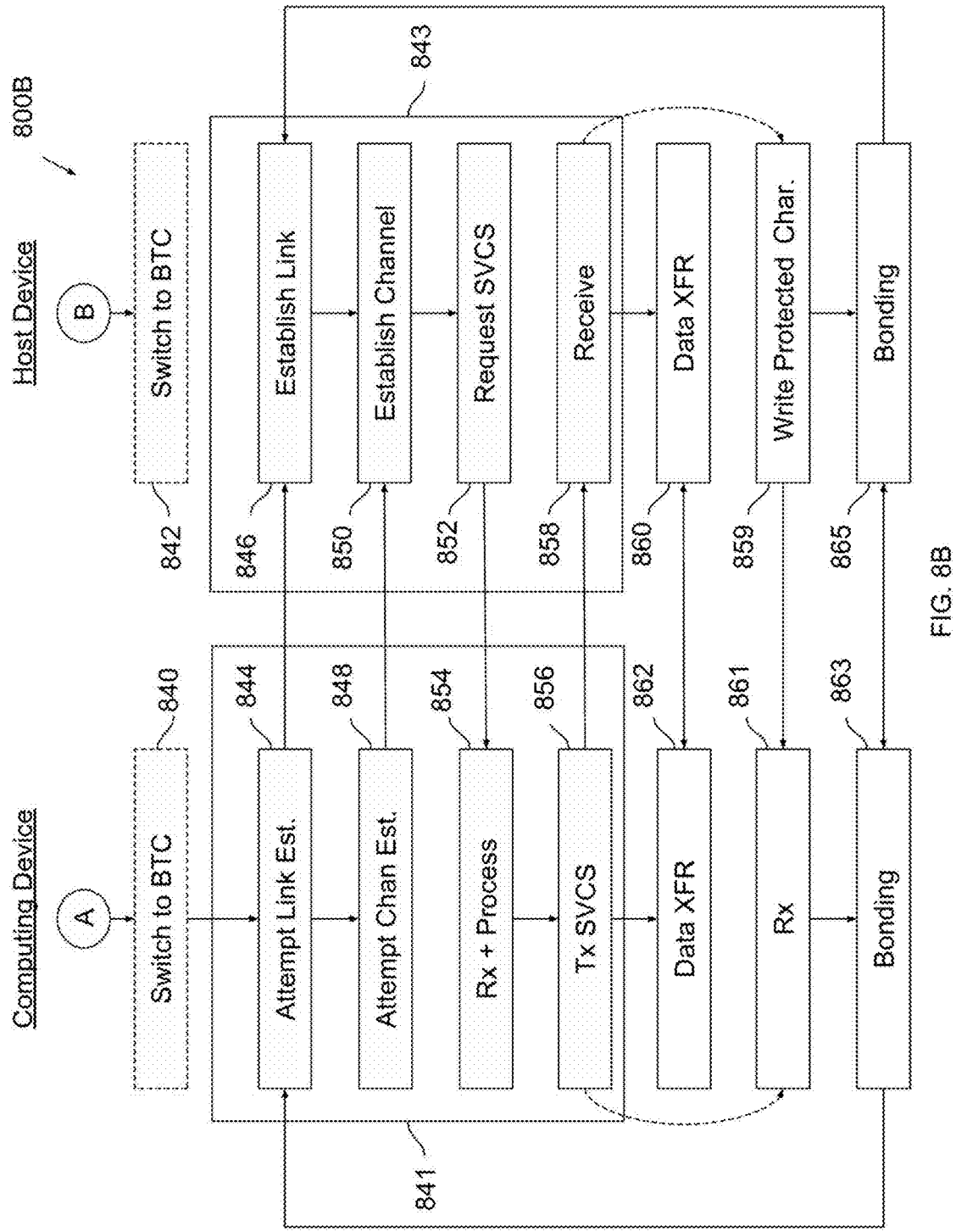
FIG. 8B is a continuation of the simplified process flow diagram of FIG. 8A in accordance with some embodiments.
Figure 8C:
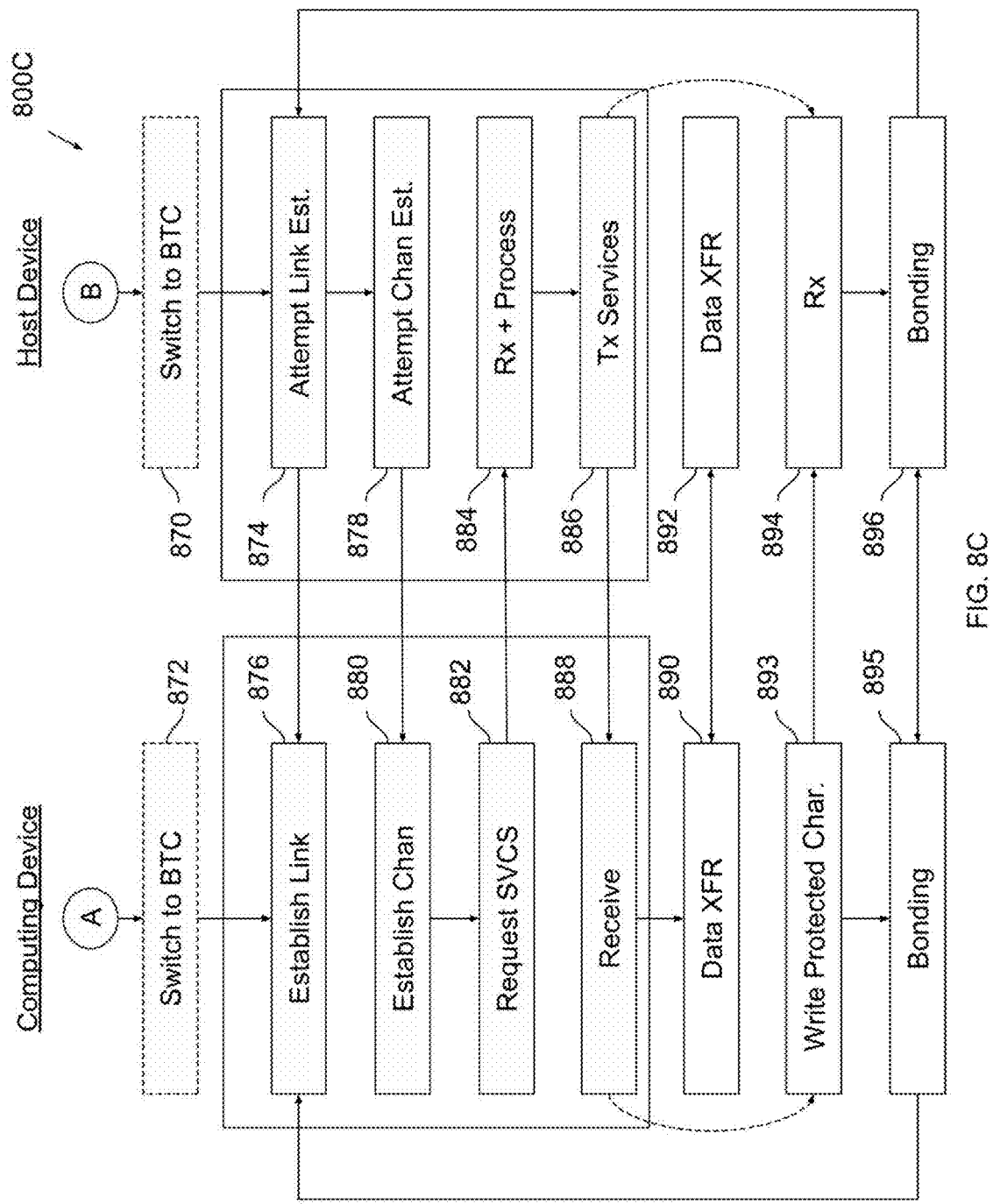
FIG. 8C is a continuation of the simplified process flow diagram of FIG. 8A in accordance with some alternative embodiments.

Referring now to FIGS. 8A to 8C, there are illustrated simplified process flow diagrams for methods of wirelessly coupling a wearable computing device to a host computing device. Methods 800a, 800b, and 800c may be performed by a host computing device, such as host computing device 140 of system 100 depicted in FIG. 1 or host computing device 440 of FIG. 4, and a wearable computing device, such as wearable computing device 110 of system 100 depicted in FIG. 1 or wearable computing device 210 of FIG. 2.

As described elsewhere herein, the host computing device generally has a host processor, a host memory and at least one host wireless communication interface. The host wireless communication interface is generally capable of communication via a low-power personal area network, a general personal area network, or both. The host processor can be configured to carry out portions of the methods 800a, 800b, and 800c depicted as being performed by the host computing device.

Likewise, and as described elsewhere herein, the wearable computing device generally has a device processor, a device memory and at least one device wireless communication interface. The device wireless communication interface is generally capable of communication via the low-power personal area network, the general personal area network, or both. The device processor configured to carry out portions of the methods 800a, 800b, and 800c depicted as being performed by the wearable computing device.

In at least some implementations or embodiments, wireless coupling may be a multi-stage process. For example, in an iOS device, wireless coupling may involve a pre-authorization stage that occurs via a low-power personal area network, such as method 800a. Method 800a begins at 802, with the host computing device entering a mode in which it listens on one or both of its personal area network interfaces (e.g., general and low-power) for advertisement packets.

At 804, the wearable computing device transmits an advertisement packet on the low-power personal area network, such as a Bluetooth™ LE personal area network. In some cases, the wearable computing device may periodically and repeatedly transmit the advertisement packet. In some embodiments, the advertisement packet may contain a Generic Access Profile (GAP) as defined by the Bluetooth™ LE protocol. In at least some implementations or embodiments, the advertisement packet may define the services of a device to which the wearable computing device wishes to connect (e.g., a mobile handset that supports delegated communications), and may contain a request for the recipient device to initiate the further coupling process.

At 806, the host computing device receives the transmitted advertisement packet via the low-power personal area network and processes the advertisement packet to determine that it can offer the requested services.

In response to the advertisement packet, at 808, the host computing device transmits a connection attempt packet to the wearable computing device. In some cases, the host computing device may first attempt to determine if a connection strength is above a connection strength threshold (e.g., to determine if the wearable computing device is "close enough") prior to transmitting the connection attempt packet. In some cases, the host computing device may also first prompt a user to confirm whether to proceed with transmitting the connection attempt packet (e.g., so that the user can confirm that the wearable computing device belongs to the user).

At 810, the wearable computing device receives the connection attempt packet and, optionally, ceases transmission of further advertisement packets for the duration of the low-power personal area network connection, or if a general personal area network connection is later established, for the duration of the general personal area network connection.

At 812, the wearable computing device confirms that the connection attempt was successful by transmitting a success message to the host computing device.

At 814, the host computing device receives the success message.

In some cases, the exchange of connection attempt confirmations and success messages may be referred to as pre-pairing (or in some cases, simply pairing) via the low-power personal area network.

At 816, the wearable computing device initiates service discovery by transmitting a request to the host computing device.

The wearable computing device receives the request at 818 and transmits a services list to the host computing device in response.

At 820, the wearable computing device registers for notifications from the host computing device and, at 822, the host computing device receives the registration request and processes it to begin notifying the wearable computing device of characteristic updates.

At 824, the host computing device determines that a characteristic has been updated (or sends an initial characteristic or characteristics), and transmits a characteristics notification to the wearable computing device. Characteristics may be considered as, for example, containers for user data, also referred to as attributes, which are stored and maintained as part of the services offered by the host computing device.

The wearable computing device receives the characteristics at 826 and processes them as needed. In some cases, the wearable computing device may wish to write characteristics, in which case it may do so by transmitting a write characteristics message to the host computing device in response, at 828. The host computing device receives and processes the characteristics list at 830.

The wearable computing device may return to 820, and the host computing device may return to 822, as additional characteristics are read and written. Characteristic reading and writing may be used to carry out a pre-authorization routine, which can be a prelude to establishing a general personal area network connection.

Upon completion of the pre-authorization routine, in which the wearable computing device may obtain the necessary keys and authorizations to continue with establishing a personal area network connection, the wearable computing device and the host computing device may switch to a general personal area network coupling method, as shown in FIG. 8B or FIG. 8C.

In some embodiments, the wearable computing device may write a characteristic that can be used to call and activate an application program resident on the host computing device. The application program, when called, may activate the general personal area network interface and place it into a pairing ready mode.

Following execution of method 800a, the wearable computing device and host computing device are coupled via a low-power personal area network and ready for pairing via a general personal area network. The wearable computing device and host computing device may initiate pairing via the general personal area network, such as a Bluetooth™ personal area network (as distinguished from Bluetooth™ LE), and as described further in method 800b or 800c.

Referring now specifically to FIG. 8B, this is illustrated a process flow diagram of an example method of continuing method 800a of FIG. 8A. The wearable computing device continues from node A of method 800a, and the host computing device continues from node B of method 800a.

At 840, the wearable computing device activates its general personal area network interface, if it is not already active. Likewise, at 842, the host computing device activates its general personal area network interface, if it is not already active. In some embodiments, the wireless coupling between the wearable computing device and host computing device may begin at this stage, i.e., without the pre-authorization of method 800a. For example, in host computing devices that use the Android operating system, the wireless coupling may begin directly with Bluetooth Classic connection.

At 844, the wearable computing device attempts to establish a link with the host computing device via the general personal area network. At 846, the link is established with the host computing device.

At 848, the wearable computing device attempts to establish a channel via the previously established link. At 850, the channel is established.

In response to establishment of the channel, the host computing device may request a services list at 852. The wearable computing device receives the request at 854 and processes the request.

At 856, the wearable computing device transmits a services list in response to the services list request, which is received by the host computing device at 858.

In some cases, such as when the host computing device uses the Android operating system, the wearable computing device and host computing device may be fully coupled or paired at this stage, and may begin to exchange data, at 860 and 862, according to the services agreed upon previously.

In some other cases, such as when the host computing device uses the iOS operating system, further acts may be used to complete wireless coupling. In such cases, the host computing device may write a protected characteristic at 859, which may be received and read at 861. The wearable computing device may begin a bonding key exchange at 863, with the host computing device completing the key exchange at 865. Thereafter, the wearable computing device may repeat acts 841 (i.e., 844 to 856) using the newly acquired keys. Similarly, the host computing device may repeat acts 843 (i.e., 846 to 858) to complete pairing and begin exchanging data at 860 and 862.

Referring now specifically to FIG. 8C, this is illustrated a process flow diagram of an example method of continuing method 800a of FIG. 8A. The wearable computing device continues from node A of method 800a, and the host computing device continues from node B of method 800a.

At 870, the host computing device activates its general personal area network interface, if it is not already active. Likewise, at 822, the wearable computing device activates its general personal area network interface, if it is not already active. In some embodiments, the wireless coupling between the wearable computing device and host computing device may begin at this stage, i.e., without the pre-authorization of method 800a. For example, in host computing devices that use the Android operating system, the wireless coupling may begin directly with Bluetooth Classic connection.

At 874, the host computing device attempts to establish a link with the wearable computing device via the general personal area network. At 876, the link is established with the wearable computing device.

At 878, the host computing device attempts to establish a channel via the previously established link. At 880, the channel is established.

In response to establishment of the channel, the wearable computing device may request a services list at 882. The host computing device receives the request at 884 and processes the request.

At 886, the host computing device transmits a services list in response to the services list request, which is received by the wearable computing device at 888.

In some cases, such as when the host computing device uses the Android operating system, the wearable computing device and host computing device may be fully coupled or paired at this stage, and may begin to exchange data according to the services agreed upon previously.

In some other cases, such as when the host computing device uses the iOS operating system, further acts may be used to complete wireless coupling. In such cases, the host computing device may write a protected characteristic at 893, which may be received and read at 894. The wearable computing device may begin a bonding key exchange at 895, with the host computing device completing the key exchange at 896. Thereafter, the wearable computing device may repeat acts 876 to 888 using the newly acquired keys. Similarly, the host computing device may repeat acts 874 to 886 to complete pairing and begin exchanging data at 890 and 892.

Figure 9A:
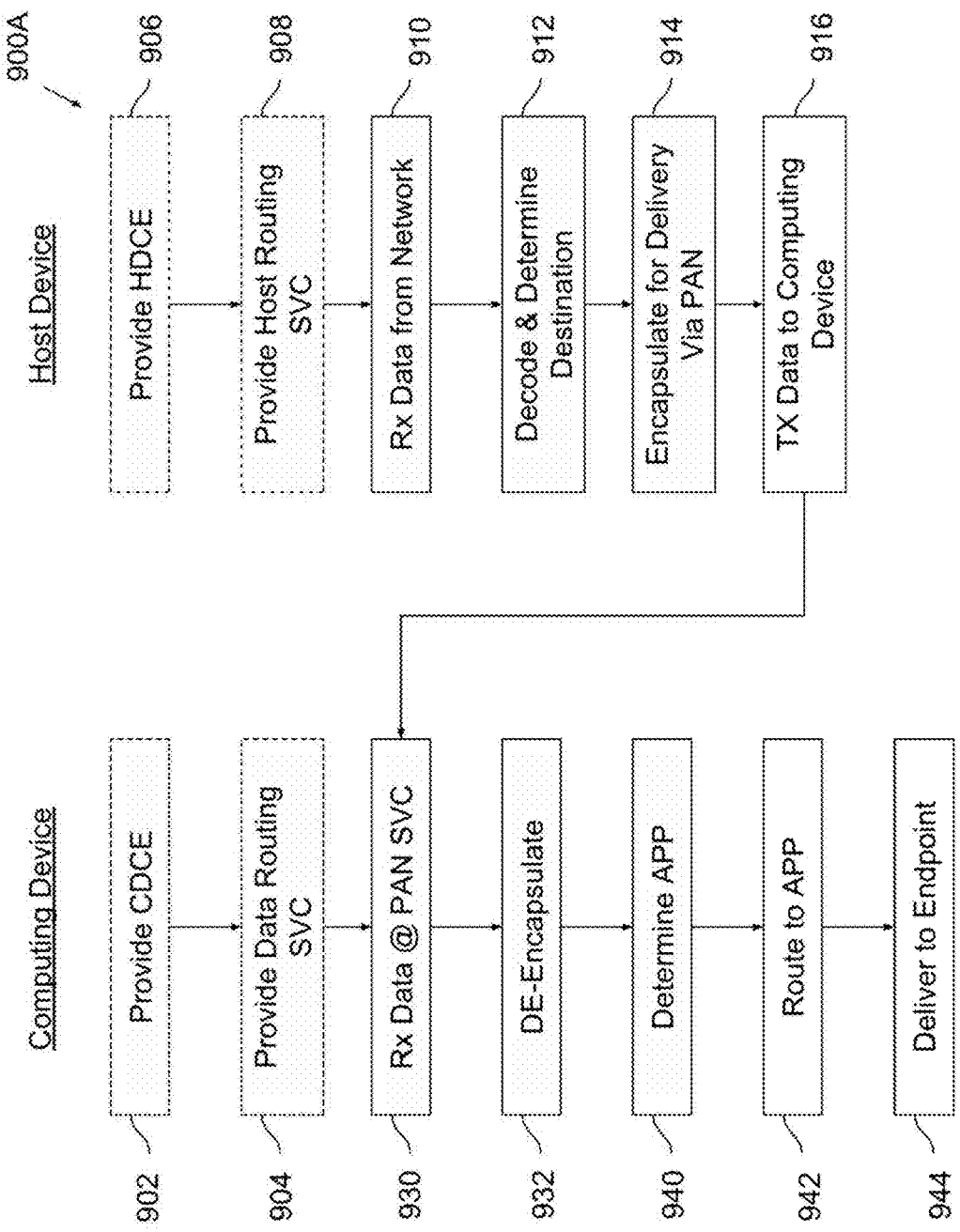
FIG. 9A is a simplified process flow diagram of a method of facilitating communication between a wearable computing device and a remote network via a host computing device connected to the remote network in accordance with some embodiments.
Figure 9B:
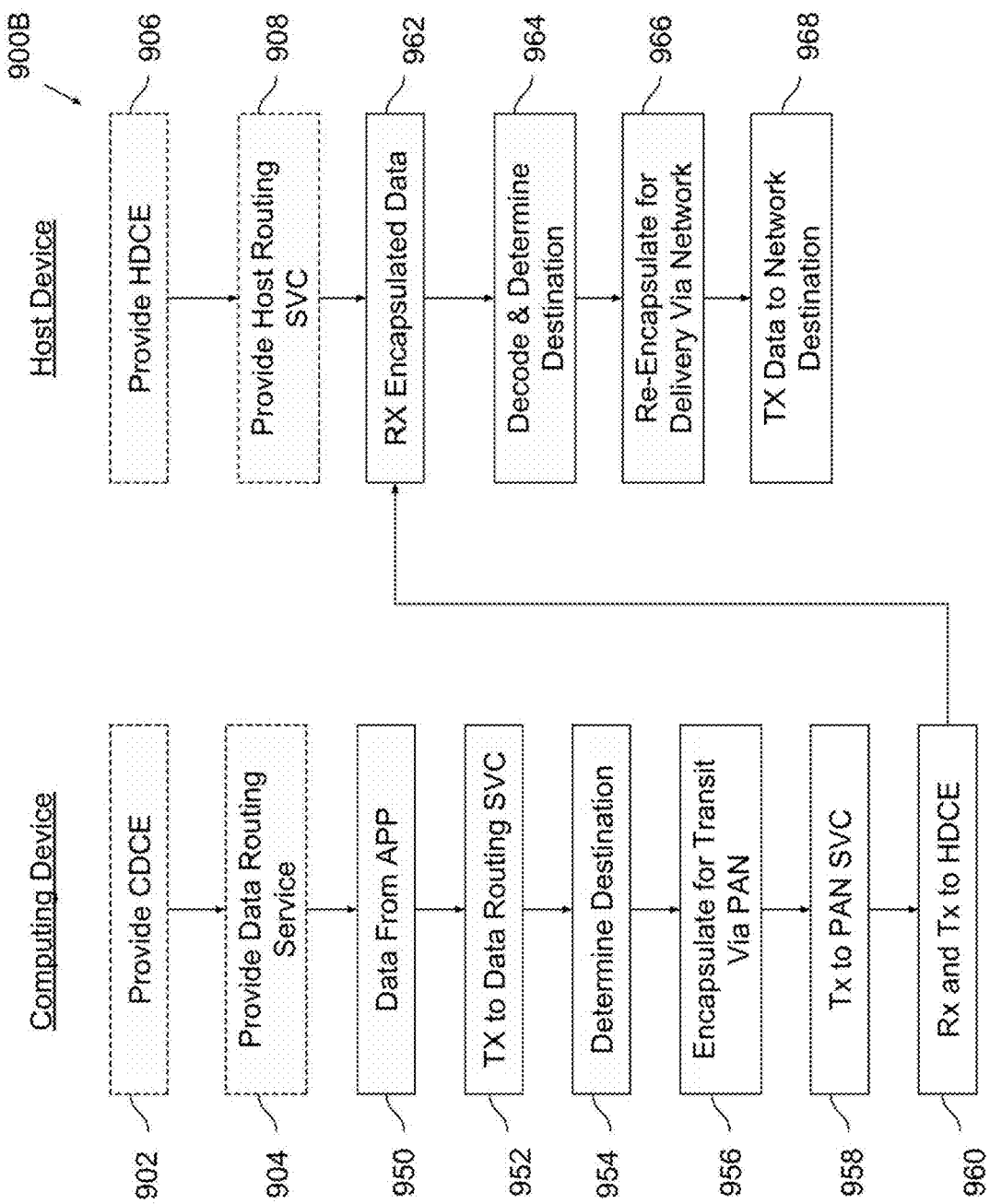
FIG. 9B is a simplified process flow diagram of a method of facilitating communication between a wearable computing device and a remote network via a host computing device connected to the remote network in accordance with some embodiments.

Referring now to FIGS. 9A and 9B, there are illustrated a simplified process flow diagram of a method of facilitating communication between a wearable computing device and a remote network via a host computing device connected to the remote network. Methods 900a and 900b may be performed by a host computing device, such as host computing device 740 of system 700 depicted in FIG. 7, and a wearable computing device, such as wearable computing device 710 of system 700 depicted in FIG. 7.

As described elsewhere herein, the host computing device generally has a host processor, a host memory and at least one host wireless communication interface. The host wireless communication interface is generally capable of communication via a low-power personal area network, a general personal area network, or both. As described herein, the host computing device may execute a host routing service which provides a host data communications endpoint. The host processor can be configured to carry out portions of the methods 900a and 900b depicted as being performed by the host computing device.

Likewise, and as described elsewhere herein, the wearable computing device generally has a device processor, a device memory and at least one device wireless communication interface. As described herein, the wearable computing device may execute a data routing service, and may execute application programs which interface with a client data communications endpoint. The device wireless communication interface is generally capable of communication via the low-power personal area network, the general personal area network, or both. The device processor configured to carry out portions of the methods 900a and 900b depicted as being performed by the wearable computing device.

Method 900a begins with the wearable computing device providing the client data communications endpoint at 902 and data routing service at 904. Similarly, the host computing device provides the host data communications endpoint at 906 and host routing service at 908.

At 910, the host computing device receives a data packet from the network and forwards the data to the host routing service. The data packet may be formatted according to an Internet Protocol.

At 912, the host routing service analyzes the data packet and determines that the destination of the packet is the wearable computing device.

In response, at 914, the host routing service encapsulates the packet using a transport protocol and addresses the encapsulated packet to the wearable computing device. When encapsulating, each packet may be associated with a connection identifier, which can be unique for each discrete socket that is accessing the physical channel. In this way, packets can be transmitted and received for multiple discrete sockets concurrently, while still being delivered over a single physical channel. In some cases, encapsulation may be performed using Google Protocol buffers. However, in some cases, the transport protocol may enable the transmission of arbitrary data outside of Protocol buffer messages, which can facilitate companion service library operation.

At 916, the host routing service transmits the encapsulated packet to the host personal area network service, which transmits the encapsulated packet to a counterpart service of the wearable computing device via the personal area network.

At 930, the personal area network service of the wearable computing device receives the encapsulated packet and forwards it to the data routing service.

At 932, the data routing service de-encapsulates the packet and determines a local destination.

At 940, the wearable computing device determines the destination application (or proxy service) for the de-encapsulated packet and, at 942, the de-encapsulated packet is forwarded to the destination. Finally, upon receiving the de-encapsulated packet, the companion service library of the destination application can then deliver the packet to the local destination at 944. Generally, the local destination is an application program that can receive the data packet and process it as desired.

Method 900a may be performed substantially in reverse when the direction of data transmission is from the wearable computing device to the network.

Method 900b begins with the wearable computing device providing the client data communications endpoint at 902 and data routing service at 904. Similarly, the host computing device provides the host data communications endpoint at 906 and host routing service at 908.

At 950, an application program executed by the wearable computing device generates a data packet and interfaces with a client data communications endpoint to transmit the packet.

At 952, the data packet is transmitted to the data routing service, which determines a destination for the data packet at 954. The data routing service can, in some cases, use a priority queuing mechanism to allow for certain types of data traffic to be given priority over less important traffic. For example, over-the-air software updates or analytics data may be given lower priority than real-time navigation data.

At 956, the data routing service encapsulates the packet in a transport protocol and forwards the encapsulated packet to the wearable computing device personal area network service at 958.

At 960, the personal area network service transmits the encapsulated packet to the host computing device, via the personal area network.

At 962, the personal area network service of the host computing device receives the encapsulated packet. The encapsulated packet is de-encapsulated by the host routing service at 964 and its network destination is determined.

Optionally, at 966, the packet may be formatted according to an Internet Protocol, if it is not already so formatted.

At 968, the packet is forwarded to a network service, where it is then transmitted via the communications interface to the network and its eventual destination, such as a remote computing device.

Method 900b may be performed substantially in reverse when the direction of data transmission is from the wearable computing device to the network.

The client data communications endpoint and the host data communications endpoint described herein each may be implementations of a client-side and a host-side socket interface, respectively. Both socket interfaces may be implementations of Unix-style sockets, Internet sockets, or both.

Referring to FIG. 10A, shown therein is a perspective view of a ring body member 1002 of a controller device, such as controller device 120, according to one embodiment. The ring body member 1002 can be worn around a user's finger. The shape of the ring body member 1002 is shown for illustrative purposes and is not limited to the illustrated shape. Other shapes can be used. For example, the ring body member 1002 can have a general shape of a circular band, a helix, or a spiral. The ring body member 1002 can have any appropriate shape that allows the ring body member to remain positioned around the user's finger.

A ring body member 1002 having a tear drop shape is shown in FIG. 10A. The ring body member 1002 has an upper end 1004 and a lower end 1006.

In another embodiment, the ring body member can have a spiral shape or a helical shape.

In another embodiment, the ring body member can have a circular band shape. With a circular band shape, the radius of the ring body member is generally constant.

In some embodiments, the ring body member can have at least one break. The break can allow the ring body member to expand. When the ring body member can expand, it can accommodate or tolerate fingers have different ring sizes.

The ring body member 1002 can be formed of a conductive material. For example, the conductive material can be, but is not limited to a metal such as aluminum or copper, or any combination thereof.

In some embodiments, the ring body member 1002 can be formed of a non-conductive material. The ring body member 1002 can include an insert. When the ring body member 1002 is formed of a non-conductive material, the insert can be metallic.

The ring body member 1002 can be coated. For example, the ring body member 1002 can be coated with paint. In another example, the ring body member 1002 can be coated with a conductive material.

The ring body member 1002 can have a controller device 1008. In some embodiments, the controller device 1008 may have a joystick portion 1009. The joystick portion may be movable in two or more axes. For example, the joystick may be movable in lateral x- and y-axes. In some embodiments, the joystick may also be movable in a third vertical axis, or z-axis, which may be used to indicate selections. The joysticks may be biased, e.g., with a spring or elastic member, to a starting position.

The ring body member 1002 can include a filler member positioned within the break and connecting the first end portion and the second end portion. The filler member can be formed of a dielectric material.

Referring to FIGS. 10B and 10C, shown therein is a perspective view and a block diagram representation of an electronic circuit 1010 housed within the ring body member 1002 shown in FIG. 10A, according to one embodiment.

In some implementations or embodiments, the electronic circuit 1010 shown in FIGS. 10A and 10B can be mounted on a flexible printed circuit board (PCB) 1012. In some embodiments, some or all of the electronic circuit 1010 can be mounted on a reinforcement member for increasing the stiffness of the apparatus. For example, the reinforcement member can be formed of a metallic material.

The electronic circuit 1010 can include a communication interface 1040, a first arm 1020 and a second arm 1050 of a radiofrequency antenna. When the communication interface 1040 is located between the first arm 1020 and the second arm 1050, causing a disconnect between the first arm 1020 and the second arm 1050, the electronic circuit can form a dipole antenna. The first arm 1020 is connected to an RF feed 1030. The second arm 1050 includes a ground patch 1052 mounted on a ground plane surface 1054. That is, the second arm 1050 is connected to ground.

The communication interface 1040 can be facilitate communication via a communication network. The communication interface 1040 can be a Bluetooth™ Low Energy chip having a signal frequency of about 2400 MHz to about 2500 MHz. In some embodiments, the communication interface 1040 can operate signals having a frequency in a band of 100 MHz, 200 MHz, 300 MHz, 400 MHz, 800 MHz, and 900 MHz.

The electronic circuit 1010 can also include additional electronic components which can be collectively referred to as 1030, such as a harvester unit 1032 capable of harvesting energy, a sensor unit 1034 for detecting hand gestures made by the user and generating signals based on the gestures; and an electrical energy storage 1036 component capable of storing energy harvested by the harvester unit and providing power to the electronic circuit.

The harvester unit can be a piezoelectric harvester unit. In some embodiments, the harvester unit can harvest energy from direct impact. In some embodiments, the harvester unit can harvest energy from vibrations. In some embodiments, the harvester unit can be an electrodynamic harvester unit. The additional electronic components can also include an AC-DC converter (not shown). The additional electronic components 1030 is shown for illustrative purposes and is not limited to the illustrated shape, sizes, or positions shown.

As noted, the wearable computing devices described herein, such as wearable computing device 110 of FIG. 1, wearable computing device 210 of FIG. 2 and/or wearable computing device 710 of FIG. 7 may, in some embodiments, be head-mounted eyeglasses devices, also referred to as wearable heads-up displays or head-mounted displays.

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. Examples of wearable heads-up displays include: the Google Glass®, the Optinvent Ora®, the Epson Moverio®, and the Microsoft Hololens® just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date are bulky to enable adequate display performance and, as a result, appear very unnatural on a user's face compared to the sleeker and streamlined look of typical eyeglass and sunglass lenses. However, a traditional eyeglasses frame is problematic when correct alignment of optical components carried by the eyeglasses frame is a necessity for a high quality display. Because traditional eyeglasses have hinges where the arms meet the rest of the frame, any optical components carried on the arms may move relative to the rest of the frame or to the eye of the user while being worn, resulting in loss of or distortion of the display. There is a need in the art for means to successfully integrate electronic components into smaller frames in order to achieve the inconspicuous form factor and fashion appeal expected of the eyeglass frame industry while still maintaining a high display quality.

Another important factor in the design of electronic devices, including wearable heads-up displays, is the integration of components that allow for communication between devices. Examples of systems that integrate such inter-device connectivity are smart phones, watches, and headphones with Bluetooth® radio antennas. However, the design form factor and location of an antenna within an electronic device is important because the location of the antenna relative to other components, both electronic and non-electronic, within the device impacts the functionality of the antenna. In some cases, interference from other components within the device significantly reduces the range, signal strength, and overall connectivity capabilities of the antenna, thus preventing the antenna from effectively connecting or communicating with other electronic devices. In many cases, a similar result occurs depending on the distance and orientation of the antenna relative to an external device with which the antenna is communicating. As such, there remains a need in the art for integrating radio antennas into a compact, aesthetically-pleasing form factor for a wearable heads-up display in order to maximize connectivity, range, and signal strength of the antenna, regardless of the position of an external device relative to the antenna over a given range.

In at least some embodiments, a wearable heads-up display may be provided in the form of eyeglasses frames and eyeglasses frames assemblies carrying an antenna for inter-device connectivity. Such glasses may include a minimal form factor that is aesthetically pleasing and an antenna design that enables superior range, signal strength, and overall connectivity capabilities of the antenna.

Figure 11:
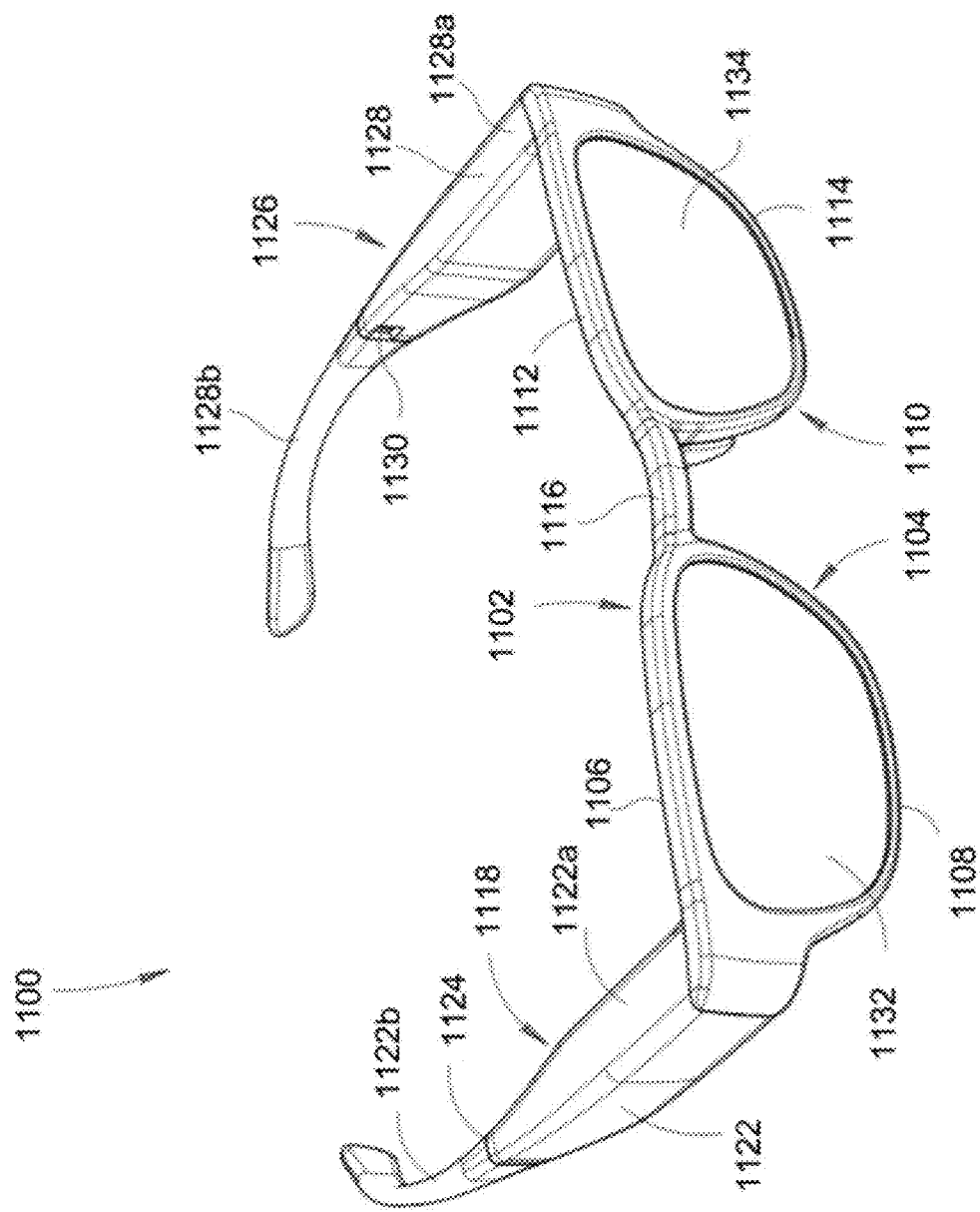
FIG. 11 is a perspective view of an exemplary implementation of a glasses frame formed according to the present disclosure.

FIG. 11 illustrates an exemplary implementation of eyewear in the form of a pair of eyeglasses 1100 having a first arm 1118, a second arm 1126 and a front eyeglass frame 1102 formed in accordance with the present disclosure. The front eyeglass frame 1102 includes a first rim 1104 having a first upper peripheral portion 1106 and a first lower peripheral portion 1108. The front eyeglass frame 1102 further includes a second rim 1110 having a second upper peripheral portion 1112 and a second lower peripheral portion 1114 and a bridge 1116 securely physically coupling the first rim 1104 and the second rim 1110. In an implementation, the bridge 1116 is coupled to the first rim 1104 and the second rim 1110 between the first upper peripheral portion 1106 and the second upper peripheral portion 1112. In addition, the front eyeglass frame 1102 may be formed as a single, unitary, integral piece or as separate components fastened together with one or more adhesives, screws, or other fasteners.

Eyeglasses 1100 also include the first arm 1118 coupled to the first rim 1104 and having a first temple portion 1122. Temple portion 1122 is preferably hollow in order to house certain components as described herein. In an implementation, first arm 1118 is stiff and inflexible such that when first arm 1118 is coupled to the front eyeglass frame 1102, first arm 1118 maintains a fixed position relative to the front eyeglass frame 1102. In the illustrated implementation, there is no hinge connecting the arm 1118 of the eyeglasses 1100 to the front eyeglasses frame 1102, in contrast to traditional eyeglasses, although other implementations include such a hinge.

Further, in an implementation, the first temple portion 1122 has a first hinge 1124 which separates first temple portion 1122 into a first anterior part 1122a and a first posterior part 1122b, wherein first posterior part 1122b folds in towards the front eyeglasses frame 1102. In other words, the first hinge 1124 is coupled between the first anterior part 1122a and the first posterior part 1122b such that the first posterior part 1122b is rotatable relative to the first anterior part 1122a and the front eyeglass frame 1102 about the first hinge 1124 along at least one axis of rotation passing through the first hinge 1124.

The pair of eyeglasses 1100 includes a second arm 1126 coupled to the second rim 1110 having a second temple portion 1128. Second temple portion 1128 is hollow. In an implementation, second arm 1126 is stiff and inflexible such that when second arm 1126 is coupled to the front eyeglass frame 1102, second arm 1126 maintains a fixed position relative to the front eyeglass frame 1102. There is no hinge connecting the second arm 1126 of the eyeglasses 1100 to the front eyeglasses frame 1102, in contrast to traditional eyeglasses.

In an implementation, second temple portion 1128 has a second hinge 1130 which separates second temple portion 1128 into a second anterior part 1128a and a second posterior part 1128b, wherein second posterior part 1128b folds in towards the front eyeglasses frame 1102. In other words, the second hinge 1130 is coupled between the second anterior part 1128a and the second posterior part 1128b such that the second posterior part 1128b is rotatable relative to the second anterior part 1128a and the front eyeglass frame 1102 about the second hinge 1130 along at least one axis of rotation passing through the second hinge 1130.

Temple portions 1122 and 1128 each preferably sit on, and extend beyond, a respective ear of a user to hold eyeglasses 1100 on a head of the user. The front eyeglass frame 1102 further includes a first lens 1132 mounted in the first rim 1104 and a second lens 1134 mounted in the second rim 1110. As such, front eyeglass frame 1102 has the shape and appearance of a front of a traditional pair of eyeglasses. Lenses 1132 and 1134 may be inserted and held in respective rims 1104 and 1110 by an interference fit, friction fit, press fit, or by a heat/shrink fit. Each of rims 1104 and 1110 is of a size and shape that can receive the respective lens 1132 and 1134 and hold the lenses 1132 and 1134 in place without any movement once the lenses 1132 and 1134 are inserted. Assembly of the eyeglasses 1100 may include the technology described in U.S. Provisional Patent Application No. 62/609,607 and U.S. Provisional Patent Application No. 62/634,654.

In an implementation, eyeglasses 1100 are a wearable heads-up display wherein display-producing components are present within or carried by one or both arms 1118 and 1126 (i.e., one arm for a monocular display, both arms for a binocular display) and display components are embedded within or carried by one or both lenses 1132 and 1134. In addition, as described in more detail below, the eyeglasses 1100 may include an antenna (not shown) and a power source (not shown) to power circuitry (e.g., processor, radio (e.g., transmitter, receiver or transceiver coupled to one or more antenna)) in order to provide inter-device connectivity between the glasses 1100 and external electronic devices, such as a smart phone (not shown) or a ring worn on the user's finger as shown in FIGS. 10A to 10C, or that implements the technology described in U.S. Provisional Patent Application No. 62/236,060, U.S. patent application Ser. No. 15/282,535 (published as U.S. Patent Publication 2017/0097753), and U.S. patent application Ser. No. 15/799, 642 (published as U.S. Patent Application Publication 2018/0067621).

In an implementation, the arms 1118 and 1126 carry certain display-producing components, for example one or more of a projector (e.g., a scanning laser projector with laser diodes), or may be a micro-display (e.g., liquid crystal display (LCD) or organic light emitting diode (OLED) display). The display components embedded in the lenses 1132 and 1134 may be a waveguide which receives light from the display-producing components and guides the light towards an eye of the user, or may be a reflector, refractor, or diffractor, for example a holographic optical element. The fixed position of at least the anterior portions 1122a and 1128a of the arms 1118 and 1126 relative to the front eyeglasses frame 1102 may enable correct initial and "in-use" positioning of components such as the projector and holographic optical element, in implementations where such components are used.

Figure 12:
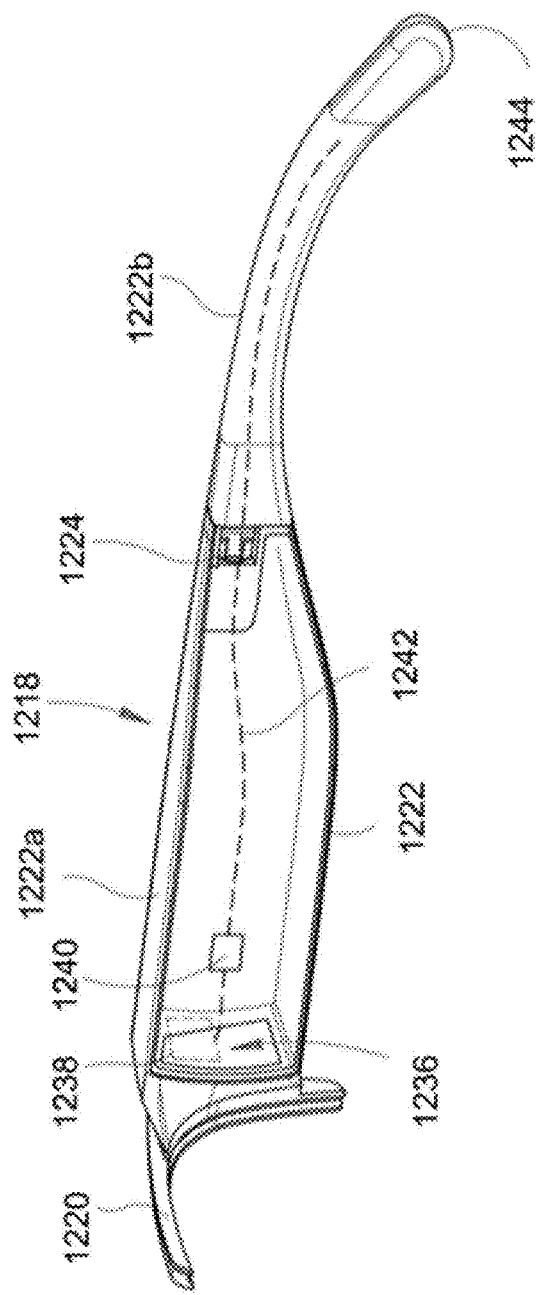
FIG. 12 is a perspective view of an exemplary implementation of a first arm of a glasses frame according to the present disclosure having an antenna housed in the arm.

Referring now to FIG. 12 with continuing reference to FIG. 11, illustrated therein is a perspective view of an exemplary implementation of a first arm 1218 of a pair of eyewear, such as eyeglasses 1100. The first arm 1218 can be substantially similar to first arm 1118 or second arm 1126 in FIG. 11. Accordingly, the features described with reference to first arm 1218 may be incorporated into implementations of first arm 1118 or second arm 1126, or both, in eyeglasses 1100, as well as in other implementations disclosed herein.

First arm 1218 includes a first frame portion 1220 and a first temple portion 1222. Temple portion 1222 is hollow and has a first aperture 1236 at the front to allow for components of a wearable heads-up display to be inserted through first aperture 1236 and placed within eyewear, for example eyeglasses 1100, as described herein. First frame portion 1220 is preferably stiff and inflexible such that when first frame portion 1220 is coupled to the front eyeglass frame 1102, first arm 1218 maintains a fixed position relative to the front eyeglass frame 1102. First frame portion 1220 and first temple portion 1222 may be formed as a single, unitary, integral component or may be two components which are combined to make first arm 1218. In the implementation illustrated in FIG. 12, first frame portion 1220 is attached to first temple portion 1222 with screws but other fasteners may be used (e.g., bolts, rivets, adhesive, epoxy, etc.).

First arm 1218 further includes a first hinge 1224, which separates the first temple portion 1222 into a first anterior part 1222a and a first posterior part 1222b. However, in some implementations, the first arm 1218 does not include the first hinge 1224, in which case the anterior and poster parts 1222a and 1222b are simply anterior and posterior portions of the temple portion 1222.

In FIG. 12, a radio 1240 is housed within the first arm 1218, and preferably within the first temple portion 1222 and even more preferably within the first anterior part 1222a of the first temple portion 1222. In some implementations, the radio 1240 may be coupled to a printed circuit board (not shown) housed in the first temple portion 1222, in which case, the radio 1240 is in electrical communication with electrically conductive traces of the printed circuit board (not shown). In an implementation, the radio 1240 can take the form of a transmitter and, or, receiver, or a transmitter. An antenna, represented by dashed lines 1242, is electrically coupled to and in electrical communication with the radio 1240. The radio 1240 and antenna(s) are operable to provide wireless communications in the radio frequency and, or microwave frequency bands of the electromagnetic spectrum.

In an implementation, the antenna 1242 extends from the radio 1240 in the first anterior portion 1222a, through the first anterior portion 1222a to at least the first posterior portion 1222b. In other implementations, the antenna 1242 extends through the first hinge 1224 toward a distal end 1244 of the first arm 1218, while in other implementations, the first hinge 1224 is not present and thus the antenna 1242 extends through the first arm 1218 toward the distal end 1244 of the first arm 1218 without passing through the hinge 1224. In still further implementations, the antenna 1242 extends from the radio 1240 to terminate proximate the distal end 1244 of the first arm 1218. While the antenna 1242 is illustrated in FIG. 12 as a dashed line, the antenna 1242 can be a variety of geometric shapes with varying cross sections.

For example, in various implementations, the antenna 1242 has a circular, ovular, triangular, rectangular, or square cross section along its length. In addition, in certain other implementations, the antenna 1242 changes size along its length, for example, a dimension between outer surfaces of the antenna 1242 proximate the radio 1240 may be greater than, equal to, or less than, a dimension between outer surfaces of the antenna 1242 proximate the distal end 1244. Still further, the antenna 1242 can change size and or shape along its length, such that in an implementation, the antenna 1242 is continuously tapered along at least a portion of its length or all of its length, while in other implementations, a greatest dimension between exterior surfaces of the antenna 1242 along its length changes multiple times, such as in a "step-down" configuration. Still further, the antenna 1242 can include different cross sections along its length along with one or more transitions, for example, a portion of the antenna 1242 proximate the radio 1240 may have a square cross section, a portion of the antenna 1242 proximate its mid-point may have a triangular cross section, and a portion of the antenna 1242 proximate the distal end 1244 may have a circular cross section. Accordingly, implementations of the present disclosure encompass a wide variety of shapes and configurations of the antenna 1242.

In other alternative implementations of the antenna, represented by dashed lines 1238, the antenna 1238 extends from the radio 1240 to terminate in, or proximate to, the first aperture 1236. In an implementation where the antenna 1238 terminates in the first aperture 1236, the antenna 1238 occupies a portion of, or substantially all of, the first aperture 1236 and may have a substantially rectangular shape, although other geometric shapes are possible. For example, antenna 1238 may be a circle, a square, an oval, a triangle, a trapezoid, a pentagon, a hexagon, or an octagon, among others. Further, the antenna 1238 may be connected to radio 1240 with a portion of the antenna 1238 having any of the above shapes, features or configurations disclosed above with reference to the implementation of the antenna represented by dashed lines 1242.

Figure 13A:
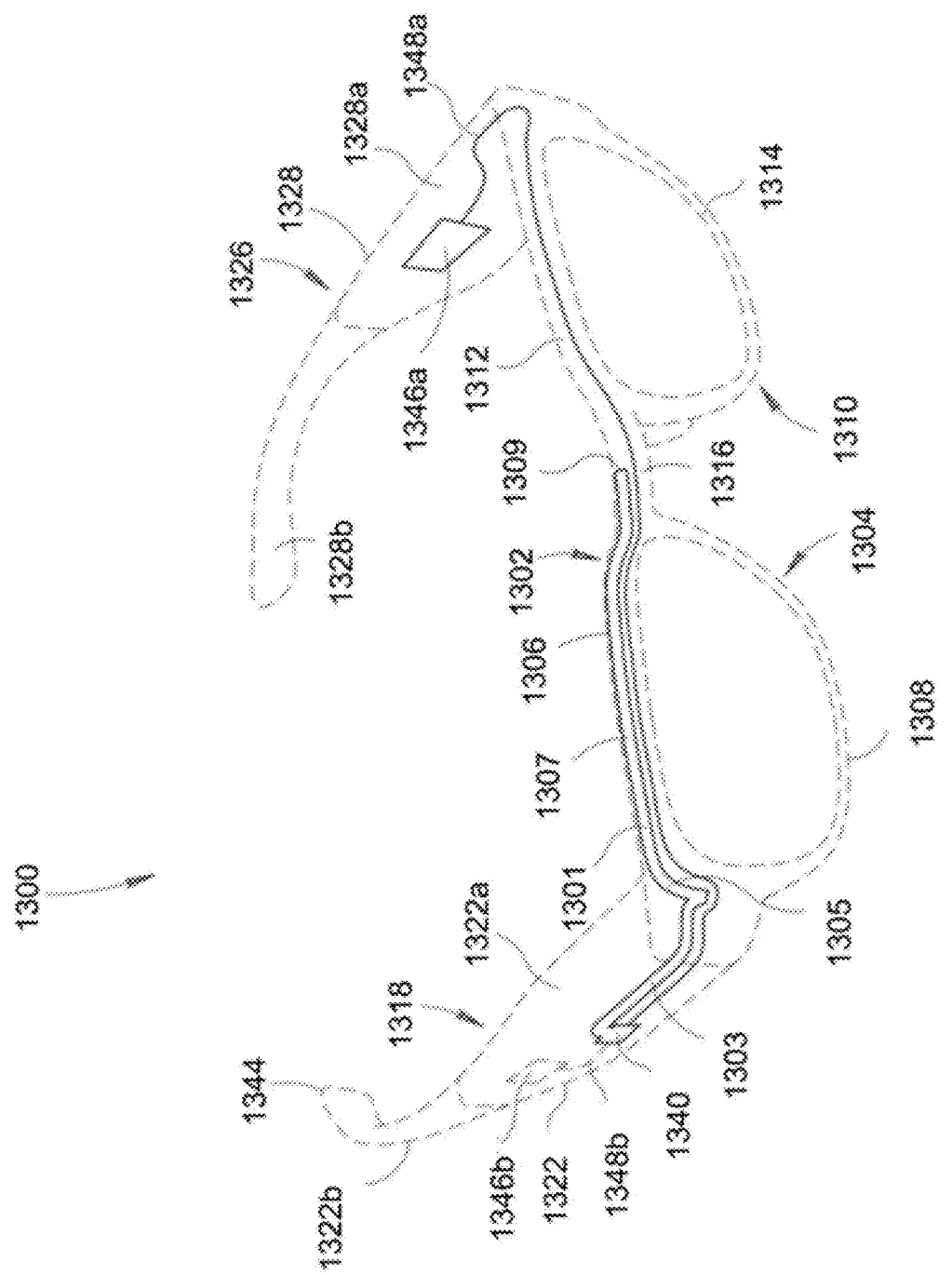
FIG. 13A is a perspective view of an alternative exemplary implementation of a glasses frame formed according to the present disclosure and having an antenna housed in the frame.

In addition, implementations of the present disclosure include an antenna, a power source, and an electrically conductive path or wire placed in various locations within a front frame of eyewear. For example, FIG. 13A is a perspective view of an exemplary implementation of eyeglasses 1300, which may be, in an implementation, substantially similar in structure to eyeglasses 1100, having an antenna 1301 incorporated in the eyeglasses 1300. FIG. 13B is a perspective view of the antenna 1301 showing features of the antenna 1301 in more detail. For ease of recognition in the drawings, eyeglasses 1300 are represented by dashed lines and certain internal features, such as the frame portions and apertures of arms 1318, 1326 are not shown, although such features are present within implementations of the eyeglasses 1300.

The eyeglasses 1300 include first and second arms 1318 and 1326 coupled to a front eyeglass frame 1302. The front eyeglass frame 1302 includes a first rim 1304 and a second rim 1310 securely physically coupled by a bridge 1316. A radio 1340 is housed internally in a first temple portion 1322 of the first arm 1318, and preferably within a first anterior portion 1322a of the first temple portion 1322 of the first arm 1318. The radio 1340 is electrically coupled to, or in electrical communication with the antenna 1301, which passes internally through the eyeglasses 1300 and front eyeglass frames 1302 of the eyeglasses 1300 as discussed below.

The antenna 1301 extends from the radio 1340 at least proximate the first temple portion 1322 and the first frame portion (not shown) of the first arm 1318, through the first aperture (not shown) and along at least a portion of the first rim 1304. In an implementation, the antenna 1301 terminates at any location within the first rim 1304, while in the implementation illustrated in FIG. 13A, the antenna 1301 extends from the radio 1340 in the first arm 1318 along a first upper peripheral portion 1306 of the first rim 1304 to terminate proximate the bridge 1316. In a further implementation, the antenna 1301 terminates in the bridge 1316, or in other words, a second distal end 1309 is a terminal end of antenna 1301 and is positioned internally within the bridge 1316 when the eyeglasses are in an operational or assembled state. In this configuration, a first portion 1303 of the antenna 1301 is housed at least partially in the first temple portion 1322 of the first arm 1318 and a second and third portion 1305 and 1307 of the antenna 1301 are housed at least partially in the first frame 1304, and more preferably within the first upper peripheral portion 1306 of the first frame 1304.

Although not specifically shown, the antenna 1301 can extend beyond the bridge 1316 to terminate within the second rim 1310. For example, in an implementation, the antenna 1301 extends from the radio 1340, through the first upper peripheral portion 1306 of the first rim 1304, through the bridge 1316 to terminate within either a second upper peripheral portion 1312 or a second lower peripheral portion 1314 of the second rim 1310. The antenna 1301 can pass internally from the radio 1340, through the first aperture (not shown) of the first arm 1318 to at least a first lower peripheral portion 1308 of the first rim. In such an implementation, the antenna 1301 terminates within the first lower peripheral portion 1308, within the bridge 1316 as above, or beyond the bridge 1316 to a location within the second rim 1310. In implementations where the antenna 1301 passes through the first lower peripheral portion 1308 of the first rim 1304 and extends beyond the bridge 1316, the antenna 1301 can terminate within the second upper peripheral portion 1312 or the second lower peripheral portion 1314 of the second rim 1310. It is even possible, in an implementation, to extend the antenna from the first arm 1318, through the first rim 1304, the bridge 1316, and the second rim 1310 to terminate within the second arm 1326.

FIG. 13A further illustrates a power source 1346*a*. In a preferred implementation, the power source 1346*a* is housed internally within a second temple portion 1328 of the second arm 1326, and more preferably within a second anterior portion 1328*a* of the second temple portion 1328 of the second arm 1326. The power source 1346*a* may be a portable power source, such as a battery or a supercapacitor (i.e., capacitor with capacitance on the order of 0.01F or greater). In addition, where the power source 1346*a* is a battery, the battery can be rechargeable (i.e., a user inserts an external charging cord into glasses 1300 to charge the battery comprising the power source 1346*a*), or replaceable (i.e., the glasses 1300 include a removable cover for removing and replacing the battery or batteries comprising the power source 1346*a*). In implementations where the power source 1346*a* is one or more replaceable batteries, circuitry may be housed within either of the arms 1318 and 1326, and more specifically within either of the first and second temple portions 1322 and 1328, to receive the battery or batteries and provide an electrical connection between the battery or batteries and the radio 1340. In other words, the circuitry is communicatively coupleable to the replaceable battery or batteries comprising the power source 1346*a*. However, in implementations where the power source 1346*a* is a rechargeable battery or a supercapacitor, the same or substantially similar circuitry may be present to connect the power source 1346*a* to the radio 1340. The power source 1346*a* is electrically coupled to the radio 1340 by wire 1348*a* to transmit electric current from the power source 1346*a* to power the radio 1340, as well as any other electronic components housed within the first temple portion 1322 of the first arm 1318.

In an implementation, the wire 1348*a* passes internally from the power source 1346*a* housed within the second temple portion 1328, through a second aperture (not shown) in the second arm 1326, the second rim 1310, the bridge 1316, the first rim 1304, the first aperture (not shown) to the radio 1340 in the first temple portion 1322. As with the antenna 1301, the wire 1348*a* can pass through any of the elements of the front eyeglass frame 1302, irrespective of the location of the antenna 1301. For example, in various implementations the wire 1348*a* passes internally through the second upper peripheral portion 1312 of the second rim 1310, the bridge 1316, and the first upper peripheral portion 1306 of the first rim 1304. In other implementations, the wire 1348*a* passes through the second lower peripheral portion 1314, the bridge 1316, and the first upper peripheral portion 1306 of the first rim 1304. In alternative implementations, the wire 1348*a* passes through the second upper peripheral portion 1312, the bridge 1316, and the first lower peripheral portion 1308. Accordingly, implementations of the present disclosure are not limited by the path of the wire 1348*a* through the front eyeglass frame 1302.

In other variations, the power source and wire are located within the first temple portion 1318 along with the radio 1340, as represented by dashed lines 1346*b* and 1348*b*, respectively. In such an implementation, the wire 1348*b* preferably does not pass through any portion of the front eyeglass frame 1302. Rather, the power source 1346*b* is housed proximate the radio 1340 and electrically coupled to radio 1340 by wire 1348*b*. It may even be possible to include the power source 1346*b* within a first anterior portion 1322*b* of the first temple portion 1322 or a second anterior portion 1328*b* of the second temple portion 1328. In other words, in an implementation, the power source 1346*b* is located within the first anterior portion 1322*b* proximate a distal end 1344 of the first arm 1318 or within the second anterior portion 1328*b* of the second temple portion 1328.

FIG. 13B is a perspective view of the antenna 1301. In other words, FIG. 13B illustrates an implementation of the antenna 1301 that is capable of extending through various parts of the front eyeglass frame 1302 as described with reference to FIG. 13A. With continuing reference to FIGS. 13A-B, the antenna 1301 includes the first portion 1303, the second portion 1305, and the third portion 1307 extending between first and second distal ends 1317 and 1309. The antenna 1301 is preferably a single, unitary, integral piece comprised of portions 1303, 1305, and 1307. In an implementation, the first portion 1300 is substantially perpendicular to second portion 1305 and third portion 1307 is substantially perpendicular to second portion 1305. The antenna 1301 and portions 1303, 1305, and 1306 preferably have a size and a shape to extend from the first arm 1318, through the first aperture (not shown) and into the front eyeglass frame 1302. The antenna 1301 further includes opposing surfaces 1311 and 1313, wherein the opposing surfaces 1311 and 1313 are each substantially flat and planar along at least a portion of their length, or in some implementations, substantially all of their length. A connector 1315 is coupled to the antenna 1301, or formed as a single, unitary, integral component of the antenna 1301, proximate the first distal end 1317 for enabling connection with the radio 1340.

In addition, implementations of the present disclosure include the antenna 1301 having a variety of geometric shapes and orientations. For example, in various implementations, the antenna 1301 has a circular, ovular, triangular, rectangular, or square cross section along its length, or along at least a portion of its length. In addition, in certain other implementations, the antenna 1301 changes size along its length, for example, a dimension between outer surfaces 1311, 1313 of the antenna 1301 proximate the first distal end 1317 may be greater than, equal to, or less than, a dimension between outer surfaces 1311, 1313 of the antenna 1301 proximate the distal end 1317. Additionally or alternatively, the antenna 1301 can change shape along its length, such that in an implementation, the antenna 1301 is continuously tapered along at least a portion of its length or all of its length, while in other implementations, a greatest dimension between exterior surfaces 1311, 1313 of the antenna 1301 along its length changes multiple times, such as in a "step-down" configuration (i.e., a first dimension between outer surfaces 1311, 1313 is greater than a second dimension, which is greater than a third dimension, and so on). Still further, the antenna 1301 can include different cross sections along its length along with one or more transitions, for example, the first portion 1303 of the antenna 1301 proximate the first distal end 1317 may have a square cross section, the second portion 1305 may have a triangular cross section, and the third portion 1307 may have a circular cross section.

In other implementations, the antenna 1301 may include one or more curved or bent portions along its length, as well as portions which are substantially flat and planar. For example, a height of the antenna 1301 relative to the first distal end 1317 may increase from the first distal end 1317 to the first portion 1303 and remain relatively constant through the first portion 1303, increase in the second portion 1305 and remain constant in the second portion 1305, and remain constant in the third portion 1307 relative to an upper portion of the second portion 1305. In other implementations, the opposite may be true (i.e., the first distal end 1317 is the highest point relative to other portions of the antenna 1301). In still further implementations, each of the portions 1303, 1305, and 1307 between distal ends 1317 and 1309 may be curved, recessed, angled or indented relative to other portions. For example, in FIG. 13B, the second distal end 1309 is angled and of a lower height relative to a highest point of the third portion 1307. Accordingly, implementations of the present disclosure encompass a wide variety of shapes and configurations of the antenna 1301. As such, implementations of the present disclosure include the antenna 1301 having any potential geometric shape and configuration to correspond to implementations of the eyeglasses 1300.

In an implementation, the antenna 1301 is electrically coupled to the radio 1340 and operative to wirelessly transmit radio frequency signals that embody an established wireless communication protocol, for example, without limitation: Bluetooth®, Bluetooth® Low-Energy, Bluetooth Smart®, ZigBee®, WiFi®, Near-Field Communication (NFC), or the like. Such protocols typically employ radio frequency signals in the range of 1 GHz to 10 GHz (with the exception of NFC, which operates in the 10 MHz-20 MHz range) and may include pairing or otherwise establishing a wireless communicative link between an apparatus, such as a wearable heads-up display carrying the antenna 1301, and another external electronic device.

Figure 14A:
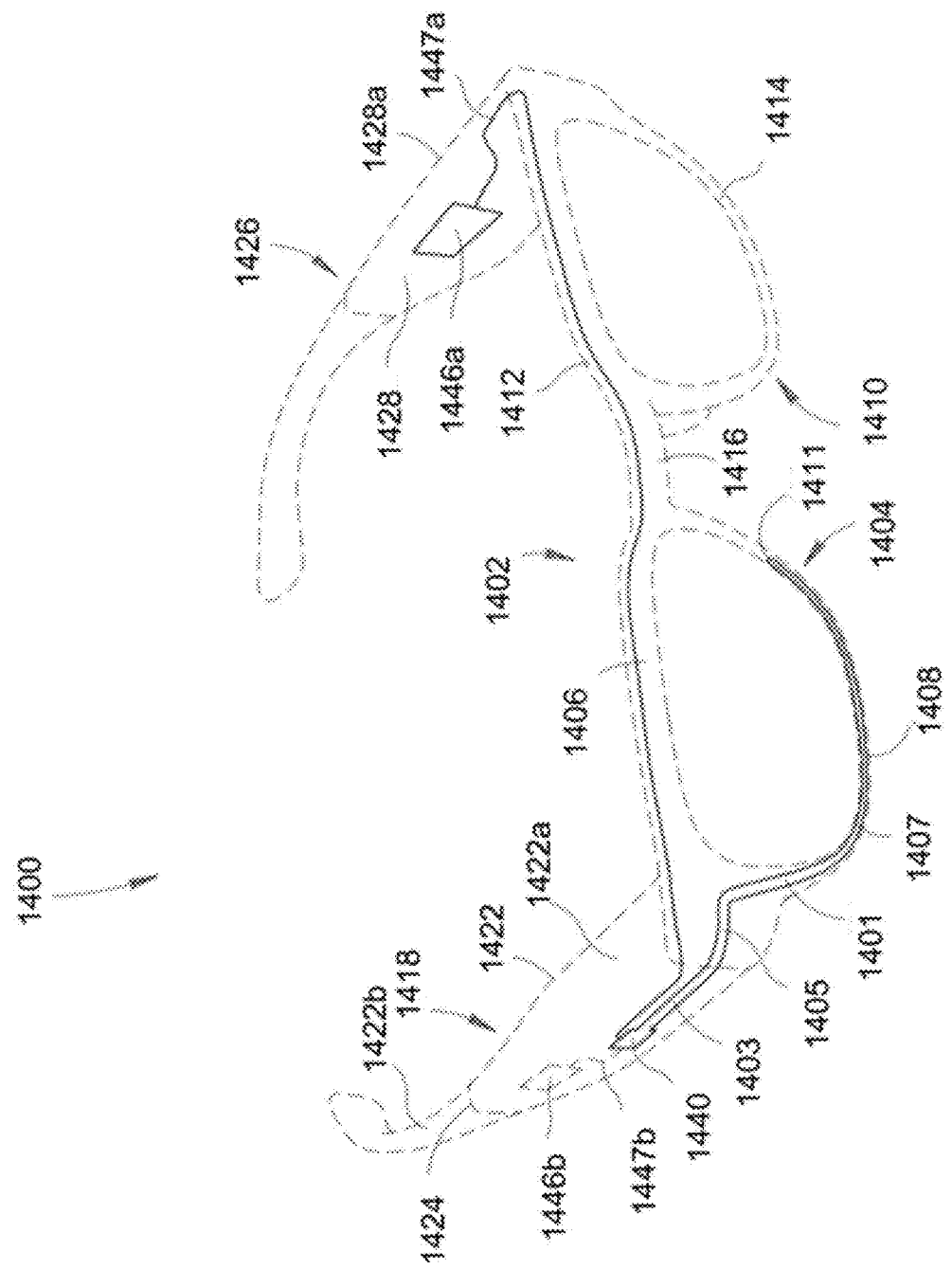
FIG. 14A is a perspective view of an alternative exemplary implementation of a glasses frame formed according to the present disclosure and having an antenna housed in the frame.
Figure 14B:
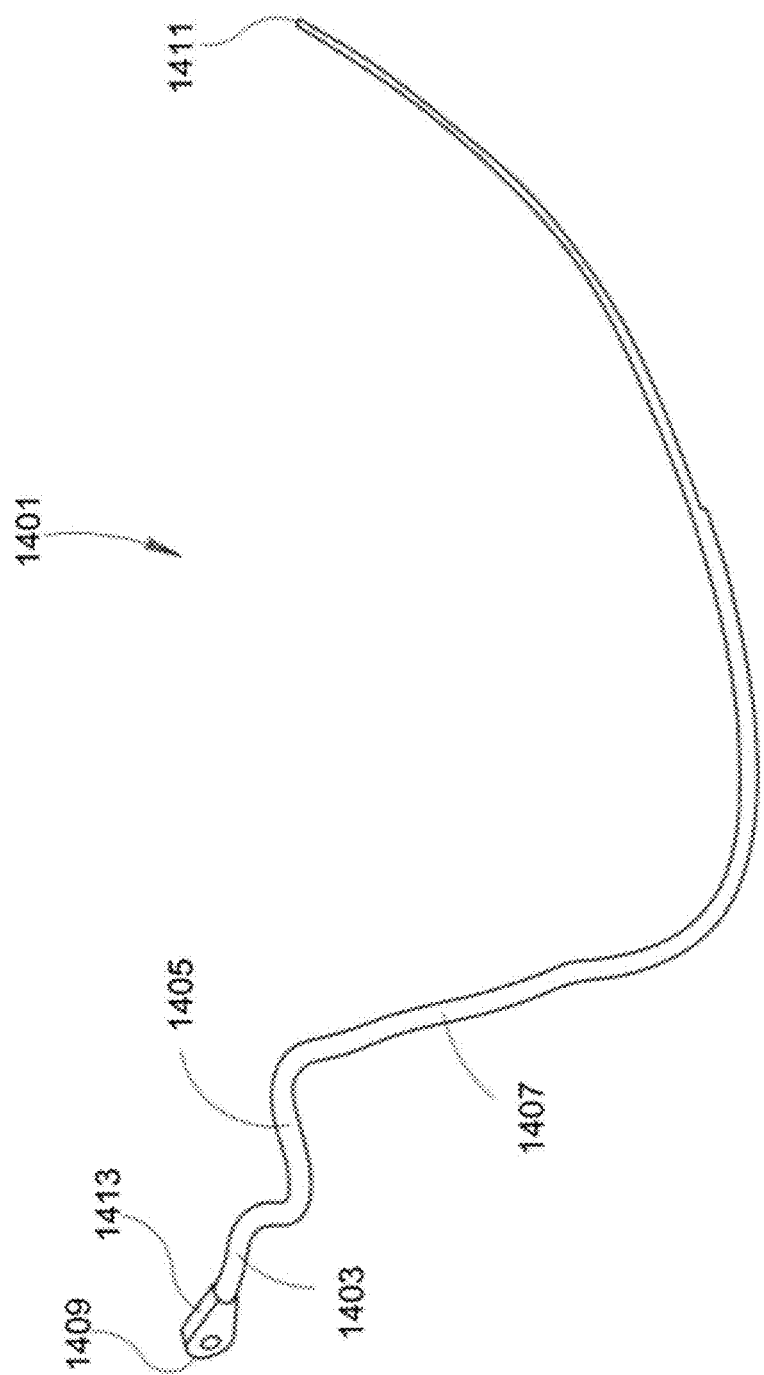
FIG. 14B is a perspective of the antenna of FIG. 14A.

FIG. 14A is a perspective view of an alternative exemplary implementation of eyeglasses 1400, which may be, in an implementation, substantially similar in structure to eyeglasses 1100, having an antenna 1401 incorporated in the eyeglasses 1400. FIG. 14B is a perspective view of the antenna 1401 showing features of the antenna 1401 in more detail. For ease of recognition in the drawings, eyeglasses 1400 are represented by dashed lines and certain internal features, such as the frame portions and apertures of arms 1418 and 1426 are not shown, although such features are present within implementations of the eyeglasses 1400.

The eyeglasses 1400 include first and second arms 1418 and 1426 coupled to a front eyeglass frame 1402. The front eyeglass frame 1402 includes a first rim 1404 having a first upper peripheral portion 1406 and a first lower peripheral portion 1408 and a second rim 1410 having a second upper peripheral portion 1412 and a second lower peripheral portion 1414. The first rim 1404 is securely physically coupled to the second rim 1410 by a bridge 1416. The first arm 1418 includes a first temple portion 1422, which may be separated into a first anterior portion 1422a and a first posterior portion 1422b by a hinge 1424, as described herein. Similarly, the second arm 1426 includes a second temple portion 1428, which may include a second anterior portion 1428a.

In the illustrated implementation, a radio 1440 is housed within the first temple portion 1422 of the first arm 1418, and more preferably, within the first anterior portion 1422a, although it may also be possible to house the radio 1440 in a first posterior portion 1422b of the first temple portion 1422. In the illustrated implementation, the antenna 1401 is communicatively coupled to the radio 1440 and extends internally along at least a portion of the first rim 1404. In other implementations, the antenna 1401 extends internally from the radio 1440, through part of the first temple portion 1422, through the first aperture (not shown), and along the first lower peripheral portion 1408 to terminate proximate the bridge 1416. In other words, in this implementation, a second distal end 1411 of the antenna 1401 is located within the first rim 1404, and more specifically proximate the first lower peripheral portion 1408 and the bridge 1416.

It is also possible for the antenna 1401 to extend along the first lower peripheral portion 1408 and beyond the bridge 1416 to terminate in either the second upper peripheral portion 1412 or the second lower peripheral portion 1414. Similarly, it is possible for the antenna 1401 to extend along at least a portion of the first upper peripheral portion 1406 to terminate proximate the bridge 1416, within the bridge 1416, or terminate beyond the bridge 1416 in either the second upper peripheral portion 1412 or the second lower peripheral portion 1414, although not specifically shown. Further, in an implementation, the antenna 1401 extends around only the first rim 1404, such that the antenna 1401 extends along the first lower peripheral portion 1408 to terminate with the first upper peripheral portion 1406. Accordingly, the antenna 1401 may extend along any portion of the front eyeglass frame 1402 and terminate with the same, or a different portion of any part of the front eyeglass frame 1402.

In the illustrated implementation, the antenna 1401 includes a first portion 1403, second portion 1405, and third portion 1407. The first portion 1403 is located at least partially within the first temple portion 1422, the second portion 1405 is located at least partially in the first rim 1404, and the third portion 1407 is located at least partially within the first lower peripheral portion 1408 of the first rim 1404.

FIG. 14A also illustrates a power source 1446a, which may be a portable power source, such as a battery or a supercapacitor, as above. The power source 4r46a is electrically coupled to the radio 1440 by a first electrically conductive path 1447a extending along a portion of the second rim 1410, the bridge 1416, and a portion of the first rim 1404. In other implementations, the first electrically conductive path 1447a passes internally along the second lower peripheral portion 1414, the bridge 1416 and the first upper peripheral portion 1406 of the first rim 1404, while in further alternative implementations, the first electrically conductive path 1447a passes internally along the second lower peripheral portion 1414 of the second rim 1410, the bridge 1416, and the first lower peripheral portion 1408 of the first rim 1404. The first electrically conductive path 1447a may also pass internally along the second upper peripheral portion 1412, the bridge 1416, and the first upper peripheral portion 1406 of the first rim 1404.

In addition, it is possible to have the power source, represented by dashed lines 1446b, located in the first temple portion 1422, which is to say that the power source 1446b can be located in the same arm 1418 as other electronic components, such as the radio 1440, or display producing components, and a second electrically conductive path 1447b electrically couples the radio 1440 to the power source 1446b. In this case, the second electrically conductive path 1447b extends along at least a portion of the first arm 1418, or more preferably, along at least a portion of the first temple portion 1422 and does not necessarily extend along any portion of the front eyeglass frame 1402. Further, the first and second electrically conductive paths 1447a and 1447b may be wires, although other materials capable of transmitting electric energy may be used. Accordingly, the implementations of the present disclosure are not limited by the placement of the electrically conductive paths 1447a and 1447b and the antenna 1401 within the eyeglasses 1400. Rather, any of the locations of the antennas 1142, 1301 and 1401 may be used along with any combination of the electrically conductive paths 1447a and 1447b either internal to, or external to the eyeglasses 1400.

At least one of the arms 1418 and 1426 or more preferably at least one of the temple portions 1422 and 1428 may house additional electronic components, such as one or more display-producing components, a printed circuit board, a processor, and a non-transitory processor-readable storage medium or memory, among others. Further, the arms 1418 and 1426 and the front eyeglass frame 1402 may be formed of various materials, for example various plastics (i.e., zylonite or cellulose acetate, cellulose acetate propionate, nylon, blended nylon, castor oil-based plastics) or metals (i.e., stainless steel, aluminum, titanium, monel, flexon, beryllium, and alloys of any of the above in combination with other metals), among others. Further, although the antenna 1401 and radio 1440 are illustrated herein as being housed in the first temple portion 1422, the antenna 1401 and radio 1440 can be housed in the second temple portion 1428, or in other locations with the eyeglasses 1400.

FIG. 14B is a perspective view of the antenna 1401. In other words, FIG. 14B illustrates an implementation of the antenna 1401 that is capable of extending through various parts of the front eyeglass frame 1402 as described with reference to FIG. 14A. With continuing reference to FIGS. 14A-B, the antenna includes the first portion 1403, the second portion 1405, and the third portion 1407. Preferably, the antenna 1401 is formed as a single, unitary, integral component comprised of portions 1403, 1405, and 1407 extending between a first distal end 1409 and a second distal end 1411. In an implementation, the second portion 1405 is substantially perpendicular to the third portion 1407. The antenna 1401 and portions 1403, 1405, and 1407 preferably have a size and a shape to extend from the first arm 1418, through the first aperture (not shown) and into the front eyeglass frame 1402. The antenna 1401 further includes a connector 1412 proximate the first distal end 4009 for enabling connection with the radio 1440.

In addition, implementations of the present disclosure include the antenna 1401 having a variety of geometric shapes and orientations. For example, in various implementations, the antenna 1401 has a circular, ovular, triangular, rectangular, or square cross section along its length, or along at least a portion of its length. In addition, in certain other implementations, the antenna 1401 changes size along its length, for example, a dimension between outermost surfaces of the antenna 1401 proximate the first distal end 1409 may be greater than, equal to, or less than, a dimension between outermost surfaces of the antenna 1401 proximate the second distal end 1411. Still further, the antenna 1401 can change shape along its length, such that in an implementation, the antenna 1401 is continuously tapered along at least a portion of its length or all of its length, while in other implementations, a greatest dimension between outermost surfaces of the antenna 1401 along its length changes multiple times, such as in a "step-down" or a "step-up" configuration (i.e., a first dimension between outermost surfaces is greater than or less than a second dimension, which is greater than or less than a third dimension, and so on). Still further, the antenna 1401 can include different cross sections along its length along with one or more transitions, for example, the first portion 1403 of the antenna 1401 proximate the first distal end 1409 may have a square cross section, the second portion 1405 may have a triangular cross section, and the third portion 1407 may have a circular cross section.

In other implementations, the antenna 1401 may include one or more curved or bent portions along its length, as well as portions which are substantially flat and planar. For example, a height of the antenna 1401 relative to the first distal end 1409 may increase from the first distal end 1409 to the first portion 1403 and remain relatively constant through the first portion 1403, increase in the second portion 1405 and remain constant in the second portion 1405, and remain constant in the third portion 1407. In the illustrated implementation, the opposite may be true. For example, the first distal end 1409 is the highest point relative to other portions of the antenna 1401. In still further implementations, each of the portions 1403, 1405, and 1407 between distal ends 1409 and 1411 may be curved, recessed, angled or indented relative to other portions. Accordingly, implementations of the present disclosure encompass a wide variety of shapes and configurations of the antenna 1401. As such, implementations of the present disclosure include the antenna 1401 having any potential geometric shape and configuration to correspond to implementations of the eyeglasses 1400.

In an implementation, the antenna 1401 is electrically coupled to the radio 1440 and operative to wirelessly transmit radio frequency signals that embody an established wireless communication protocol, for example, without limitation: Bluetooth®, Bluetooth® Low-Energy, Bluetooth Smart®, ZigBee®, WiFi®, Near-Field Communication (NFC), or the like. Such protocols typically employ radio frequency signals in the range of 1 GHz to 10 GHz (with the exception of NFC, which operates in the 10 MHz-20 MHz range) and may include pairing or otherwise establishing a wireless communicative link between an apparatus, such as a wearable heads-up display carrying the antenna 1401, and another external electronic device.

The various implementations described herein provide a compact, aesthetically pleasing glasses form factor that includes an antenna and a radio for enabling inter-device connectivity. Further, because a location, orientation and position of the antenna is adjustable relative to other electrical components, such as a power source and an electrically conductive path, interference between the antenna and other components within the eyeglass is minimized. As a result, implementations of the present disclosure allow for optimization of the connectivity, range, and signal strength of the antenna when transmitting or receiving signals from other electronic devices. In particular, implementations of the present disclosure enable optimal connectivity, range, and signal strength characteristics for the antenna and the radio regardless of the position of an external device within a given range.

Figure 15:
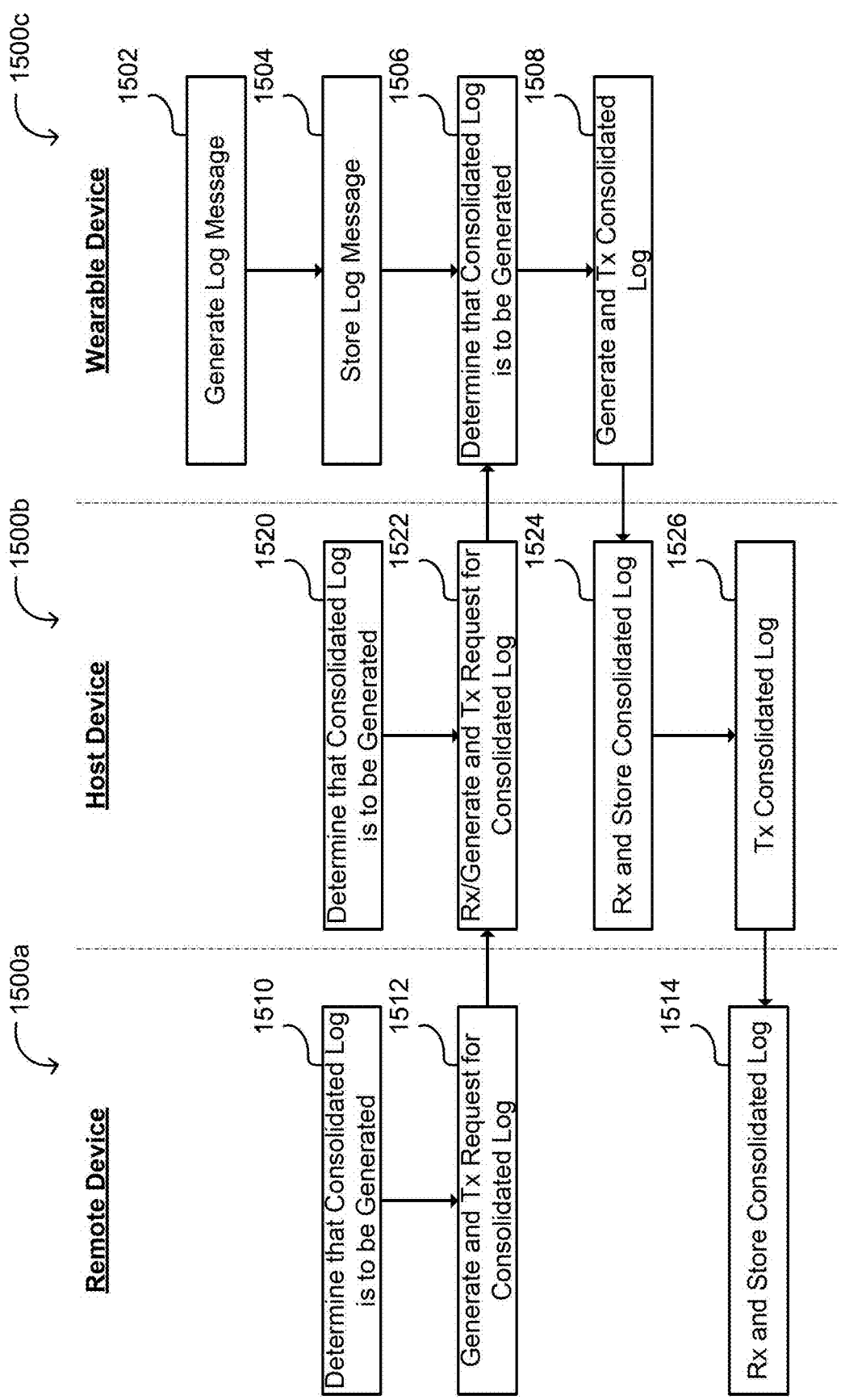
FIG. 15 is a simplified process flow diagram of a method of gathering logging data from a wearable computing device in accordance with some embodiments.

Referring now to FIG. 15, there is illustrated a simplified process flow diagram for methods of gathering logging data from a wearable computing device. Method 1500a may be performed by one or more remote computing devices, such as remote computing devices 180 of system 100 depicted in FIG. 1 and/or remote computing device 580 of FIG. 5. Method 1500b, may be performed by a host computing device, such as host computing device 140 of system 100 depicted in FIG. 1 and/or host computing device 440 of FIG. 4. Method 1500c may be performed by a wearable computing device, such as wearable computing device 110 of system 100 depicted in FIG. 1, wearable computing device 210 of FIG. 2, and/or wearable computing device 710 of FIG. 7.

As described elsewhere herein, each remote computing device generally has a remote processor, a remote memory and at least one remote communication interface. The remote communication interface is generally capable of data communication. The remote processor can be configured to carry out portions of the method 1500a depicted as being performed by the at least one remote computing device.

Likewise, and as described elsewhere herein, the host computing device generally has a host processor, a host memory and at least one host wireless communication interface. The host wireless communication interface is generally capable of communication via a low-power personal area network, a general personal area network, or both. The host processor can be configured to carry out portions of the method 1500b depicted as being performed by the host computing device.

Likewise, and as described elsewhere herein, the wearable computing device generally has a device processor, a device memory and at least one device wireless communication interface. The device wireless communication interface is generally capable of communication via the low-power personal area network, the general personal area network, or both. The device processor can be configured to carry out portions of the method 1500c depicted as being performed by the wearable computing device.

Methods 1500a, 1500b, and 1500c can begin with the generation of one or more log messages. In some implementations or embodiments, the methods begin at 1502 when the wearable computing device generates one or more log messages. At 1504, the wearable computing device stores the one or more log messages.

At 1506, the wearable computing device determines that a consolidated log is to be generated. The consolidated log includes the one or more log messages generated and stored at 1502 and 1504. In some embodiments, the wearable computing device In some implementations or embodiments, the wearable computing device can determine that a consolidated log is to be generated by receiving a request for a consolidated log transmitted by the host computing device at 1522. The request for a consolidated log can originate from the host computing device. In some cases, the host computing device can determine that a consolidated log is to be generated at 1520. At 1522, the host computing device can generate and transmit the request for a consolidated log to the wearable computing device.

Optionally, the request for a consolidated log can originate from the at least one remote computing device. That is, the at least one remote computing device can determine that a consolidated log is to be generated at 1510. At 1512, the at least one remote computing device can generate and transmit the request for a consolidated log to the host computing device. At 1522, the host can receive and transmit the request for a consolidated log to the wearable computing device.

The wearable computing device, the host computing device, and/or the at least one remote computing device can determine that a consolidated log is to be generated based on one or more conditions. For example, a consolidated log may be generated based on a preset time interval, a predefined time, a size threshold of the one or more log messages that have been generated and stored at 1502 and 1504, a power status of the wearable computing device, or a connectivity status of the wearable computing device.

Optionally, the preset time interval can begin at a time when a first log message to generated. Alternatively, the preset time interval can begin after a log message to is generated and no subsequent log messages are generated within the preset time interval. Furthermore, a consolidated log may be generated when an aggregate size of the one or more log messages that have been generated and stored at 1502 and 1504 and not yet transmitted in a previous consolidated log exceeds the size threshold.

Optionally, in order for the host computing device and/or the at least one remote computing device to determine that a consolidated log is to be generated based on the power status or the connectivity status of the wearable computing device, the host computing device and/or the at least one remote computing device can receive indicators of the power status or the connectivity status.

At 1508, the wearable computing device generates the consolidated log and transmits the consolidated log to a storage device.

In some implementations or embodiments, such as that shown in FIG. 15, the host computing device can be the storage device. That is, at 1524, the host computing device can receive the consolidated log from the wearable computing device and store the consolidated log.

In some implementations or embodiments, such as that shown in FIG. 15, the at least one remote computing device can be the storage device. That is, at 1524, the host computing device can receive the consolidated log from the wearable computing device. At 1526, the host computing device can transmit the consolidated log to the at least one remote computing device. At 1514, the at least one remote computing device can receive the consolidated log from the host computing device and store the consolidated log.

In some cases, the generation of the consolidated log at 1508 can be deferred. That is, although the wearable computing device determines that a consolidated log is to be generated, the wearable computing device can defer, or delay the generation of the consolidated log. For example, the determination that a consolidated log is to be generated may have been based on a preset time interval, a predefined time, and/or a size threshold of the one or more log messages, without accounting for the power status or the connectivity status of the wearable computing device. The wearable computing device can determine that, based on the power status and/or the connectivity status, that the generation of the consolidated log should be deferred. In particular, the power status and/or the connectivity status may be low and the generation of the consolidated log can be deferred until the power status and/or the connectivity status is sufficient (i.e., not low).

One or more additional log messages can be generated during the deferral period. That is, one or more additional log messages can be generated between the time that it is determined that a consolidated log is to be generated and the time that the consolidated log is generated. Optionally, the additional log messages can be included in the consolidated log when it is generated, or the additional log messages can be omitted from the consolidated log, and held back for a subsequent consolidated log.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by North Inc., including but not limited to U.S. Provisional Patent Application No. 62/670,200, U.S. Provisional Patent Application No. 62/609,681, U.S. Provisional Patent Application No. 62/609,607, U.S. Patent Publication 2016/0238845, U.S. Patent Publication 2016/0377866 and U.S. Patent Publication No. 2016/0377865, are incorporated herein by reference, in their entirety. Aspects of the embodiments can be modified, if necessary, to employ systems, circuits and concepts of the various patents, applications and publications to provide yet further embodiments.

The invention claimed is:

1. A method of gathering logging data from a wearable computing device, the method comprising:
generating one or more log messages by a processor of the wearable computing device;
storing the one or more log messages by the processor; and
upon determining by the processor that a consolidated log of the one or more messages is to be generated, generating the consolidated log and transmitting the consolidated log to a storage device by the processor, wherein the generating of the consolidated log is selectively deferred based on a power status or a connectivity status of the wearable computing device.

2. The method of claim 1, wherein transmitting the consolidated log to a storage device comprises transmitting the consolidated log to a host computing device.

3. The method of claim 1, wherein transmitting the consolidated log to a storage device comprises transmitting the consolidated log to a remote computing device.

4. The method of claim 1, further comprising receiving a request from a remote computing device, wherein determining by the processor that a consolidated log of the one or more messages is to be generated is based on the request.

5. The method of claim 4, wherein receiving the request from the remote computing device comprises receiving the request from the remote computing device via a host computing device.

6. The method of claim 1, wherein determining by the processor that a consolidated log of the one or more messages is to be generated is based on a preset time interval.

7. The method of claim 1, wherein determining by the processor that a consolidated log of the one or more messages is to be generated is based on a predefined time.

8. The method of claim 1, wherein determining by the processor that a consolidated log of the one or more messages is to be generated is based on a size threshold of the one or more log messages.

9. The method of claim 1, wherein determining by the processor that a consolidated log of the one or more messages is to be generated is based on a power status of the wearable computing device.

10. The method of claim 1, wherein determining by the processor that a consolidated log of the one or more messages is to be generated is based on a connectivity status of the wearable computing device.

11. A non-transitory computer-readable medium storing computer-executable instructions for gathering logging data from a wearable computing device, the instructions when executed by a computer processor of the wearable computing device for causing the computer processor to:
generate one or more log messages;
store the one or more log messages;
determine that a consolidated log is to be generated, the consolidated log comprising the one or more log messages; and
generate the consolidated log and transmit the consolidated log to a storage device, wherein the generating of the consolidated log is selectively deferred based on a power status or a connectivity status of the wearable computing device.

12. The non-transitory computer-readable medium of claim 11, wherein the instructions further cause the computer processor to receive a request from a remote computing device and determine that the consolidated log is to be generated based on the request.

13. The non-transitory computer-readable medium of claim 11, wherein the instructions further cause the computer processor to receive a request from a remote computing device via a host computing device and determine that the consolidated log is to be generated based on the request.

14. The non-transitory computer-readable medium of claim 11, wherein the instructions cause the computer processor to determine that the consolidated log is to be generated based on at least one of a preset time interval, a predefined time, a size threshold of the one or more log messages, a power status of the wearable computing device, and a connectivity status of the wearable computing device.

* * * * *